US011803541B2

(12) United States Patent
Zheng et al.

(10) Patent No.: US 11,803,541 B2
(45) Date of Patent: Oct. 31, 2023

(54) PRIMITIVE-BASED QUERY GENERATION FROM NATURAL LANGUAGE QUERIES

(71) Applicant: Salesforce, Inc., San Francisco, CA (US)

(72) Inventors: Zuye Zheng, San Francisco, CA (US);
Ryoji Osawa, San Francisco, CA (US);
James Diefenderfer, San Francisco, CA (US); Nadeem Marfani Aboobaker, Fremont, CA (US);
Praveen Pendey, San Francisco, CA (US); Sameer Sethi, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 106 days.

(21) Appl. No.: 17/072,935

(22) Filed: Oct. 16, 2020

(65) Prior Publication Data

US 2022/0121656 A1    Apr. 21, 2022

(51) Int. Cl.
*G06F 16/242* (2019.01)
*G06N 3/08* (2023.01)
*G06F 18/213* (2023.01)
*G06F 18/214* (2023.01)

(52) U.S. Cl.
CPC ........ *G06F 16/243* (2019.01); *G06F 16/2445* (2019.01); *G06F 16/2448* (2019.01); *G06F 18/213* (2023.01); *G06F 18/2155* (2023.01); *G06N 3/08* (2013.01)

(58) Field of Classification Search
CPC ............... G06F 16/243; G06F 16/2448; G06F 16/2445; G06K 9/6232; G06K 9/6259; G06N 3/08
See application file for complete search history.

(56) References Cited

U.S. PATENT DOCUMENTS

| 10,747,761 | B2 * | 8/2020 | Zhong ............... G06F 16/24522 |
| 2015/0261744 | A1 * | 9/2015 | Suenbuel ............. G06F 40/211 704/9 |
| 2021/0224275 | A1 * | 7/2021 | Maheshwari ..... G06F 16/24542 |
| 2021/0303557 | A1 * | 9/2021 | Pike .................... G06F 16/2425 |
| 2022/0043976 | A1 * | 2/2022 | Picinini ................. G06F 40/284 |

* cited by examiner

*Primary Examiner* — Mark D Featherstone
*Assistant Examiner* — Ranjit P Doraiswamy
(74) *Attorney, Agent, or Firm* — Holland & Hart LLP

(57) ABSTRACT

Methods, systems, and devices supporting primitive-based query generation are described. A database system may receive a natural language query associated with a subset of data sets stored at the database system, determine a set of tokens included in the natural language query, and label one or more tokens of the set of tokens with one or more primitives from a set of supported primitives associated with the subset of data sets. The database system may determine a set of higher order concepts corresponding to query operations, query conditions, or both based on the one or more labeled tokens. The database system may train a neural network to learn a grammatical structure of the natural language query and generate a database query for querying the database system based on the one or more labeled tokens, the set of higher order concepts, and the neural network.

20 Claims, 12 Drawing Sheets

PRIMITIVE-BASED QUERY GENERATION FROM NATURAL LANGUAGE QUERIES

FIELD OF TECHNOLOGY

The present disclosure relates generally to database systems and data processing, and more specifically to primitive-based query generation from natural language queries.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some cloud platforms may use defined grammatical structures to parse unstructured natural language queries and generate database queries. An expert user (e.g., a product manager, an administrator, etc.) may define a grammatical structure for a database system to convert natural language queries into structured database queries. However, in some cases, the defined grammatical structure may be incomplete and fail to adapt to changes in data use patterns, which may produce inaccurate and unhelpful query results.

DETAILED DESCRIPTION

Figure 1:
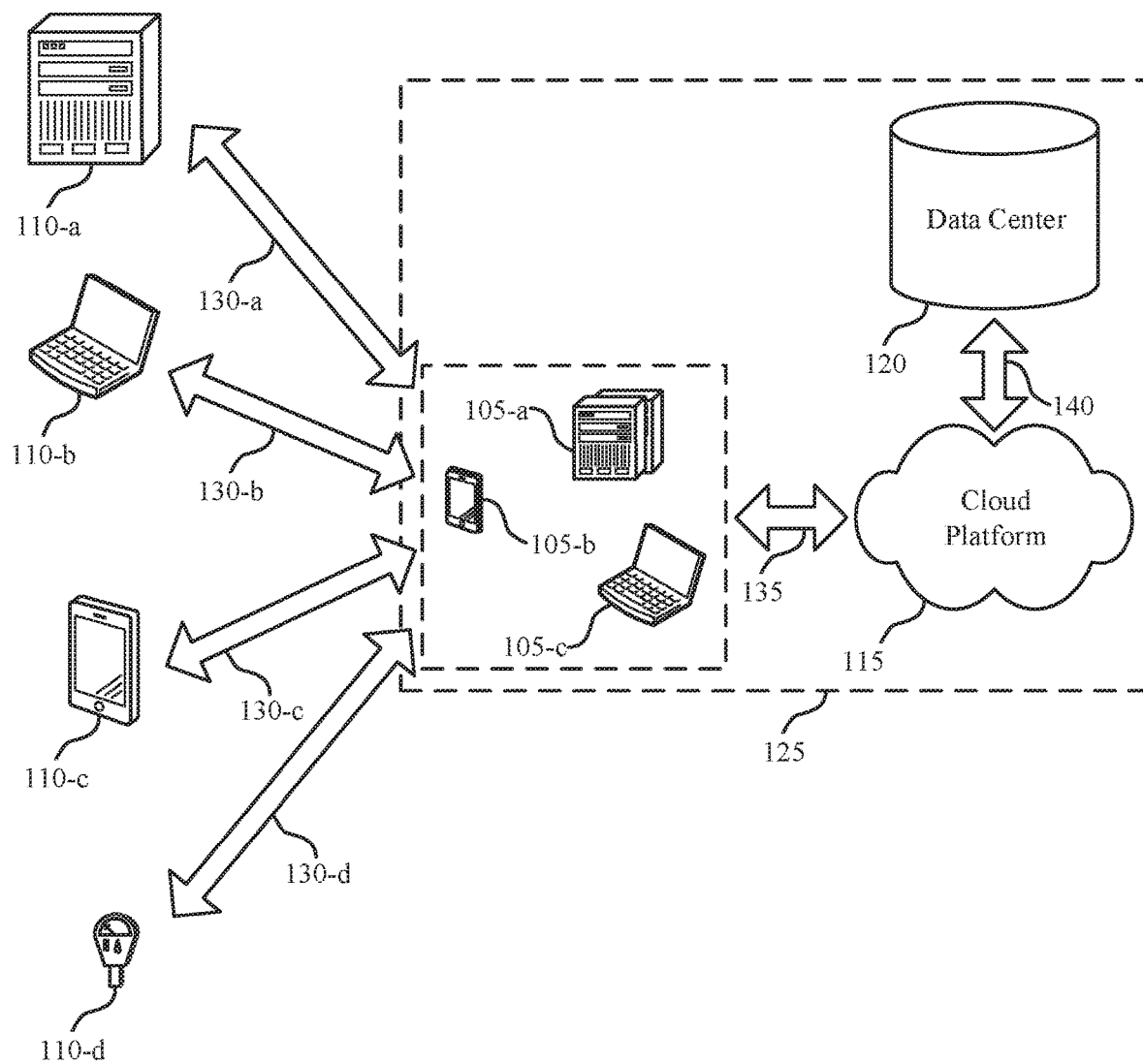
FIG. 1 illustrates an example of a system for cloud computing that supports primitive-based query generation from natural language queries in accordance with aspects of the present disclosure.

Some systems (e.g., cloud platforms or other systems) may use defined grammatical structures to parse unstructured natural language queries and generate database queries. An expert user (e.g., a product manager, an administrator, etc.) may define a grammatical structure for a database system to aid in converting natural language queries into database queries. In order to define the grammatical structure, the expert user may identify and enumerate common questions submitted to the system, enumerate all variations of the common questions, define a database query for each common question, and map each common question to a database query. A system user may submit a question to the database system, and the database system may attempt to identify a similar question that has already been enumerated, which can be used to determine the associated database query. Identifying common questions for a system and enumerating all variations of the questions may be time consuming and require expert-level domain knowledge. In some cases, the database system may support multiple spoken or written languages, and an expert user may need to define a grammatical structure for each language supported by the database system. Additionally, the types of questions submitted to the database system may evolve over time, and this may yield inaccurate grammatical structures that fail to produce database queries that are relevant to natural language queries.

Various aspects of the present disclosure provide techniques for generating structured queries based on query concepts embedded in natural language queries. Such techniques may improve the accuracy of query results, reduce system configuration time, and automatically adapt to changes in data usage patterns. A server (e.g., a database server, application server) of a database system may receive a natural language query (e.g., a submitted question, a submitted search phrase, etc.), tokenize the natural language query, label the tokens with primitive concepts, determine higher order concepts embedded in the natural language query, and generate a structured database query based on the labeled tokens and higher order concepts. The database system may maintain one or more data models (e.g., a recurrent neural network (RNN), a long short-term memory (LSTM) neural network, a multi-layer perceptron, etc.) to adapt to changes in system use and improve the accuracy of the structured database queries. In some cases, the data models may be tenant-specific and adjust to tenant-specific preferences, thereby improving structured query accuracy for specific tenants in a multi-tenant database system. The techniques described herein may additionally resolve ambiguity in search terms and features such as suggested search and autocomplete features.

Some such techniques may include generating database queries based on labeled tokens of a natural language query. For example, the database system may use the labeled tokens to determine one or more higher order concepts (e.g., embedded query concepts), and the one or more higher order concepts may be converted into one or more database queries. In some cases, the tokens, labels, and/or higher order concepts may be used to extract out multiple concepts and form a probabilistic parse of the natural language query. The database system described herein may support learning tenant-specific and/or data set-specific preferences through continual learning by tenant-specific data models. For example, the database system may allow users to relabel suggested token labels and train tenant-specific data models to incorporate the relabeling feedback. The tenant-specific data models may improve labeling accuracy for natural language query tokens through learning tenant search grammars and resolving search ambiguity. In some examples, a first data model (e.g., an RNN) may be used to learn a tenant and/or data set-specific grammar, and a second data model (e.g., a multi-layer perceptron) may be used to learn tenant and/or data set-specific context. The data models may be used to more accurately label tokens, interpret search terms, and generate database queries. The techniques described herein may support a database system that adapts to user preferences and usage behavior, improves database query accuracy, and removes the reliance on an expert user to define a grammatical structure in order to interpret natural language queries.

Aspects of the disclosure are initially described in the context of an environment supporting an on-demand database service. Aspects of the invention are then described in the context of a query generating system, a token labeling technique, a token system technique, a system architecture, and a process flow. Aspects of the disclosure are further illustrated by and described with reference to apparatus diagrams, system diagrams, and flowcharts that relate to primitive-based query generation from natural language queries.

FIG. 1 illustrates an example of a system 100 for cloud computing that supports primitive-based query generation from natural language queries in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the data center 120 may include multiple databases, servers, or other types of systems. For example, the data center 120 may include a database server and/or an application server. A database system (e.g., the database server or the application server) may receive a natural language query associated with a subset of data sets stored at the data center 120, determine a set of tokens included in the natural language query, and label one or more tokens of the set of tokens with one or more primitives from a set of supported primitives associated with the subset of data sets. The database system (e.g., the database server or the application server) may determine a set of higher order concepts corresponding to query operations, query conditions, or both based on the one or more labeled tokens. The database system may train a neural network to learn a grammatical structure of the natural language query and generate a database query for querying the database system based on the one or more labeled tokens, the set of higher order concepts, and the neural network. Based on the received natural language query and the neural network, the database system may query the data center 120 for query results using the generated database query.

In some other systems, a grammatical structure may be explicitly defined to aid in parsing unstructured natural language queries and generating structured database queries. An expert user (e.g., a product manager, an administrator, etc.) may define a grammatical structure, which may require the expert user to identify and enumerate common questions submitted to the system, enumerate multiple variations of the common questions, define a structured query for each common question, and map each common question to a structured query. Identifying common questions for a system and enumerating a large number of variations of the questions may be time consuming and require expert-level domain knowledge. Additionally, to support multiple different spoken or written languages, the system may use different grammatical structures for the different languages, significantly increasing the complexity and scope of defining grammars for handling unstructured natural language queries. Furthermore, the grammatical structures may lose accuracy as user patterns change. For example, users may replace one frequently used search term or phrase with a newer term or phrase that may not be supported by the grammatical structure, which may lead to incorrect interpretation of the natural language query and, correspondingly, inaccurate or unhelpful search results.

In contrast, the system 100 may generate structured queries based on embedded query concepts and primitives, which may reduce or eliminate the reliance on explicitly defined grammatical structures, reducing system configuration time, automatically adapting to changes in data usage patterns, and improving query results. A server (e.g., a database server, an application server, etc.) of a database system may receive a natural language query (e.g., a submitted question, a submitted search phrase, etc.), tokenize the natural language query, label the tokens with primitive concepts, determine higher order concepts embedded in the natural language query, and generate a structured database query based on the labeled tokens and higher order concepts (e.g., using a neural network). The database system may maintain one or more data models (e.g., an RNN, an LSTM neural network, a multi-layer perceptron, etc.) to adapt to changes in system use and improve the accuracy of the structured database queries. In some cases, the data models may be tenant-specific and may be trained based on tenant-specific preferences, thereby improving structured query accuracy. The techniques described herein may additionally improve the resolution of search term ambiguity.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Users of computing and cloud platforms 115 may submit a natural language query (e.g., a question, a search phrase, etc.) to a data center 120 and view the results returned by the data center 120. For example, a user may manage products of a company for a particular state and enter the natural language query "products by region." The query results may display products that are grouped by county of the state the user manages, as the system may interpret the term "region" as state counties based on prior data access patterns and may automatically return results relevant to the specific user.

Figure 2:
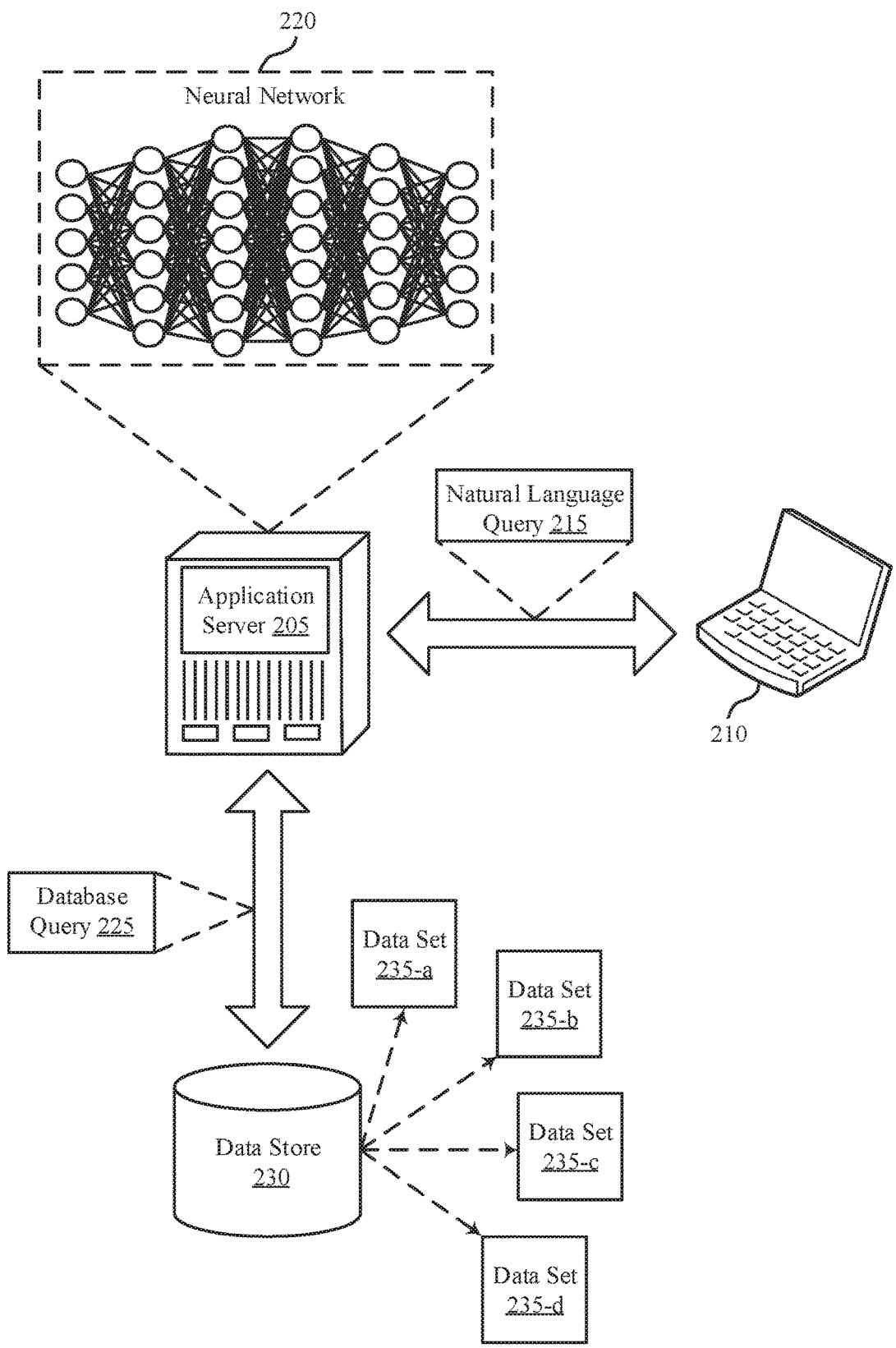
FIG. 2 illustrates an example of a query generating system that supports primitive-based query generation from natural language queries in accordance with aspects of the present disclosure.

FIG. 2 illustrates an example of a query generating system 200 that supports primitive-based query generation from natural language queries in accordance with aspects of the present disclosure. The query generating system 200 may include an application server 205, a user device 210, and a data store 230. The query generating system 200 may include aspects of a system 100 as described with reference to FIG. 1. For example, the application server 205 and/or data store 230 may be examples or components of a data center 120. For example, the application server 205 may be an example of a single server, a server cluster, a database server, a virtual machine, a container, or any other data processing device or system of devices. The user device 210 may be an example of a contact 110 or cloud client 105 described with reference to FIG. 1.

The application server 205 may support an application that receives a natural language query 215 (e.g., a user query, a user question, a user phrase, etc.) from user devices 210 and generates a database query (e.g., a relational database query, a Structured Query Language (SQL) query, a non-relational database query, a non-SQL (noSQL) query, etc.) based on the user query. A user operating the user device 210 may interact with the application to search one or more data stores 230. The application server 205 may tokenize the user query and label one or more tokens of the user query. In some examples, a user operating the user device 210 may also interact with the application to relabel tokens, and the application server 205 may train one or more neural networks 220 based on tokens that have been relabeled by the user or labeled by the application server 205.

The application server 205 may receive a user query that is associated with a subset of data sets (e.g., data set 235-a and data set 235-b) of the data sets stored in the data store 230 (e.g., data set 235-a, data set 235-b, data set 235-c, and data set 235-d). The association between the user query and the subset of data sets may be implicit or explicit. For example, the natural language query 215 may indicate a user identifier (e.g., associated with a tenant identifier, an organization identifier, etc.) that is associated with the subset of data sets, while in additional examples, the application server 205 may determine or infer the association between the natural language query 215 and the subset of data sets based on one or more terms or phrases in the natural language query 215.

The application server 205 may tokenize the natural language query 215. In some cases, tokenizing the natural language query 215 may include splitting the natural language query 215 into chunks of information. For example, the application server 205 may tokenize the natural language query 215 by splitting the natural language query 215 on white space characters to produce a group of tokens (e.g., words via a word breaking procedure). The application server 205 may label one or more tokens of the group of tokens with primitive concepts. Some tokens of the group of tokens may remain unlabeled, while some other tokens may be labeled with one or more primitive concepts. A primitive concept may include a number (e.g., 1, 100, 12.59), a numerical operator (e.g., equals, less than, greater than, between), an aggregation (e.g., a sum, an average, a minimum, a maximum, a mode, a median), a measure field (e.g., a numerical field, an amount field, a propensity to close field), a dimension field (e.g., a string field, a region field, an account field, an owner field), a field value (e.g., Canada, emea, closed, won), a date part (e.g., day, week, quarter, today, yesterday), a date modifier (e.g., this, last, next), a sort field (e.g., top, best, ascending), or the like. One or more of the primitives may be associated with the subset of data sets corresponding to the natural language query 215. For example, the measure fields, the dimension fields, the field values, or a combination thereof may be based on one or more data fields of the subset of data sets. For each token, the application server 205 may determine a score for each primitive concept, and the application server 205 may use the scores to produce zero, one, or multiple labels for each token. Some primitive concepts may use the same scoring technique, while other primitive concepts may use other scoring technique. In some examples, a score may indicate a likelihood that a specific token corresponds to a specific primitive type.

In some cases, the application server 205 may tokenize the natural language query 215 by word breaking the natural language query 215. For example, when the natural language query 215 corresponds to an alphabetical writing system (e.g., English, Danish, etc.), the application server 205 may tokenize the natural language query 215 based on space delimiters present in the natural language query 215. In some cases, for a natural language query 215 corresponding to a logographic or syllabic writing system like Hanzi or Kanji, the application server 205 may tokenize the natural language query 215 based on a procedure that determines words that are most likely to be in the natural language query 215. The application server 205 may encode the tokens with Unicode transformation format 8-bit (utf-8) encoding, which may improve system flexibility and availability. For example, because an explicit grammar may not be defined, converting to a common language using utf-8 encoding may support language agnostic processing of the natural language queries 215, such that the token labeling system described herein may apply to various different languages.

In some cases, the number primitive concept may use a binary scoring technique based on determining whether a token can be parsed into a number. For example, if the token can be parsed into a number, the token may receive a score of "1" for the number primitive, and if the token cannot be parsed into a number, the token may receive a score of "0" for the number primitive. Some primitive concepts (e.g., string-based concepts) may use a scoring technique based on determining a string distance (e.g., a Jaro Winkler distance, a Damerau-Levenshtein distance). Some scoring techniques may yield a numeric score within the range [0, 1], where 0 is the lowest score and 1 is the highest score. Some primitive concepts (e.g., categories) may include static and dynamic categories. For example, the primitive concepts "aggregation" and "date modifies" may have a known set of terms and synonyms and therefore be static, and the primitive concepts such "measure field," "dimension field," and "field values" may be dependent on the data set being targeted for the natural language query 215 and therefore by dynamic. The dynamic categories may be built using metadata or sample statistics about the targeted data set (e.g., from the data store 230). In some cases, one or more neural networks 220 may be used instead of, or in addition to, the primitive concept scoring techniques.

A neural network 220 (e.g., an RNN, an LSTM neural network, etc.) may be used to label the one or more tokens of the group of tokens. The neural network 220 may be tenant and/or data set-specific, and the neural network 220 may be used to predict a label for the one or more tokens of the group of tokens. The neural network 220 may undergo continuous training to incorporate user feedback and improve label predictions. For example, a user operating the user device 210 may relabel tokens that were incorrectly labeled, and the neural network 220 may incorporate the relabeled tokens into a training data set used for updating the neural network 220. Incorporating user feedback (e.g., relabeled tokens, labels implicitly or explicitly indicated as correct) into the neural network 220 may allow the query generating system 200 to improve and adjust with usage and shifts in data access patterns.

In some cases, the application server 205 may implement a token clustering technique to improve token labeling. The token clustering technique may include constructing n-grams for each labeled token, calculating primitive concept scores for the n-grams, and labeling the tokens and/or clusters of tokens based on the highest primitive concept scores. In some cases, each label category may be configured with a maximum "n" tokens to consider. A new cluster may consume tokens from a previous cluster (e.g., if the new cluster receives a higher score than the previous cluster), in which case the previous cluster may be rescored based on the reduced number of tokens. Clustering, as described herein, may support identifying natural language query phrases (e.g., as opposed to single words) such as "united states," which may improve labeling accuracy.

The application server 205 may determine a set of higher order concepts (e.g., embedded query concepts) based on the one or more labeled tokens and/or clusters. The higher order concepts may include multiple primitives and correspond to query operations and/or query conditions. In some cases, the application server 205 may determine the set of higher order concepts based on one or more higher order concept identification procedures (e.g., a heuristics). Some higher order concept identification procedures may identify higher order concepts such a calculation, a measure range, a date range, a limit condition, or the like. The higher order concept identification procedure for the calculation concept may include identifying all tokens that are labeled as measure fields and scanning out from the identified tokens labeled as measure fields to identify the closest token labeled as an aggregation function. In some cases, the outward scan may be bounded by a threshold specific to the higher order concept. The higher order concept identification procedure may generate a database query 225 based on identifying the measure fields and aggregation functions as a calculation function. Some examples of higher order concepts include a calculation concept (e.g., based on an aggregation primitive and a measure field primitive), a measure range concept (e.g., based on a numerical operator primitive and a number primitive), a date range concept (e.g., based on a date modifier primitive and a date part primitive), and a limit condition concept (e.g., based on a sort primitive and a number primitive).

Generating the database query 225 based on labeled primitives and higher order concepts may eliminate or reduce the need for an expert user to define grammatical structures and associate known natural language queries with known database queries. For example, using one or more neural networks 220, the system may automatically identify words or phrases of interest in a natural language query 215 and may determine the query operations and conditions to include a database query 225 based on the one or more neural networks 220.

Figure 3:
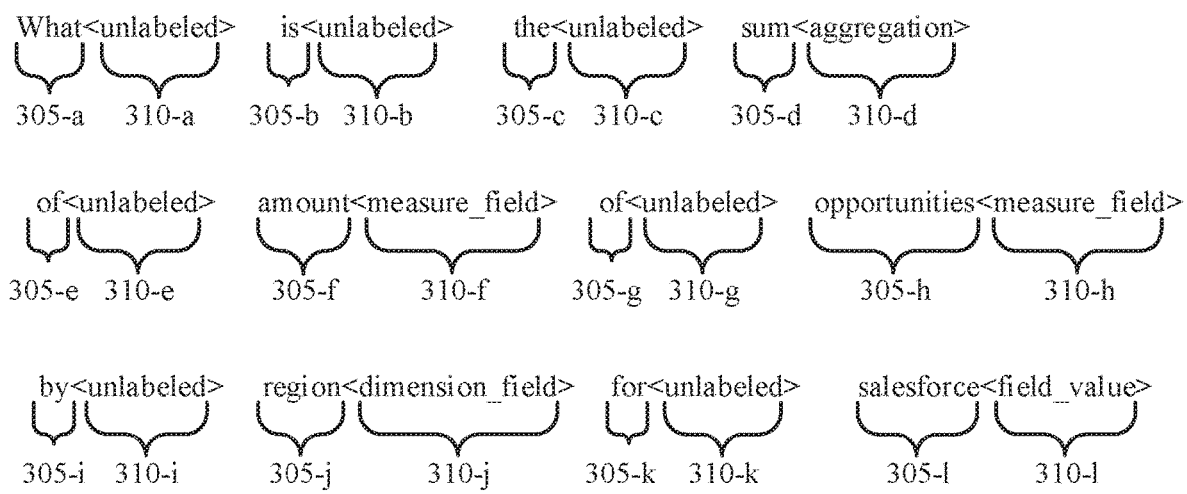
FIG. 3 illustrates an example of a token labeling technique and model training data that supports primitive-based query generation from natural language queries in accordance with aspects of the present disclosure.
Figure 3:
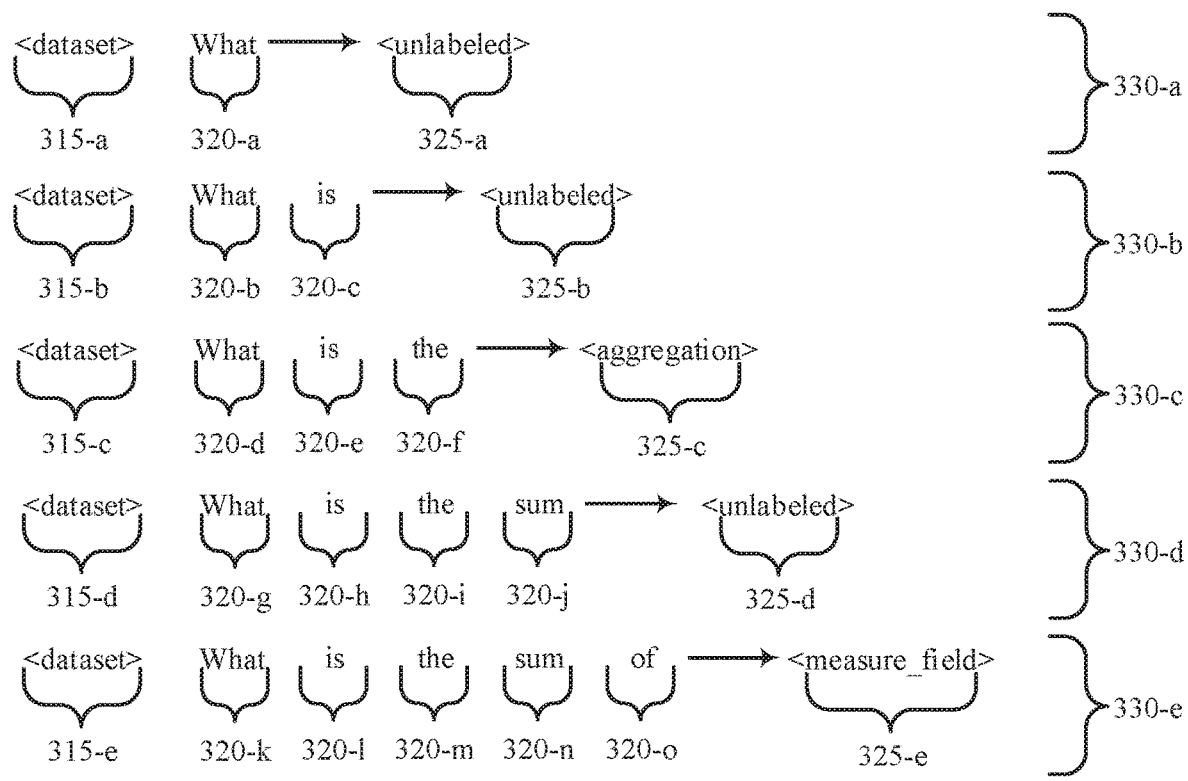

FIG. 3 illustrates an example of a token labeling technique 300 and model training data 301 that support primitive-based query generation from natural language queries in accordance with aspects of the present disclosure. The token labeling technique 300 may include a number of tokens 305 as well as a number of label fields 310. In some cases, the tokens 305 may be extracted from or generated based on a natural language query. The label fields 310 may be generated by a server, suggested by a neural network, supplied by a user operating a user device, or any combination thereof.

As a non-limiting example, a user may submit the natural language query "What is the sum of amount of opportunities by region for salesforce," and a device (e.g., an application server, a database server, etc.) may extract the tokens 305 from the natural language query. Each token 305 may be associated with a label field 310 indicating a label for the associated token 305 or indicating that the associated token 305 is unlabeled. For example, token 305-a (What) may be associated with label field 310-a (unlabeled), token 305-b (is) may be associated with label field 310-b (unlabeled), token 305-c (the) may be associated with label field 310-c (unlabeled), token 305-d (sum) may be associated with label field 310-f (aggregation), token 305-e (of) may be associated with label field 310-e (unlabeled), token 305-f (amount) may be associated with label field 310-f (measure field), token 305-g (of) may be associated with label field 310-g (unlabeled), token 305-h (opportunities) may be associated with label field 310-h (measure field), token 305-i (by) may be associated with label field 310-i (unlabeled), token 305-j (region) may be associated with label field 310-j (dimension field), token 305-k (for) may be associated with label field 310-k (unlabeled), and token 305-l (salesforce) may be associated with label field 310-l (field_value).

The observations 330 (e.g., training examples) of training data 301 may be used to train one or more data models and generated based on the token-label field pairs of token labeling technique 300. In some cases, the data set indicators 315 may be present in the training data 301, while in some other cases, the data set indicators 315 may not be present in the training data 301. For example, the observations 330 may be used to train a data set-specific data model when the observations include the data set indicators 315, and the data set indicators 315 may be removed from the observations 330 to train a non-data set-specific (e.g., a universal) data model.

Each observation 330 may include a sequence of tokens 320 and a label field 325, and the label field 325 may correspond to the label field of the token that follows the sequence of tokens 320. For example, token 305-a (what) is followed by token 305-b (is), and token 305-b (is) is associated with label field 310-b (unlabeled). As such, token 320-a (what) is followed by label field 325-a (unlabeled). Accordingly, this observation 330-a indicates an example in which the word "What" is followed by an unlabeled word. A neural network trained using such an observation 330-a may therefore predict that the word "What" is likely to be followed by an unlabeled word (e.g., depending on other observations related to the word "What"). In observation 330-b, the sequence of tokens 320-b (what) and 320-c (is) is followed by label field 320-b (unlabeled), because the label field 310-c (unlabeled) follows the sequence of tokens 305-a and 305-b. As shown in in observation 330-c, label field 325-c (aggregation) follows the sequence of tokens 320-d (what), 320-e (is), and 320-f (the), because label field 310-d (aggregation) follows the sequence of tokens 305-a (what), 305-b (is), and 305-c (the). Observation 330-d illustrates label field 325-d (unlabeled) following the sequence of tokens 320-g (what), 320-h (is), 320-i (the), and 320-j (sum), and observation 330-e illustrates label field 325-e (measure field) following the sequence of tokens 320-k (what), 320-l (is), 320-m (the), 320-n (sum), and 320-o (of). Additional observations 330 may be generated based on the tokens 305 and label fields 310 of labeling technique 300. In some examples, each observation 330 may illustrate the label field that has been observed to follow a sequence of tokens. In some cases, the length of the sequences may be determined based on a minimum length, a maximum length, or both.

The observations 330 may be used to train one or more data models (e.g., artificial neural networks, LSTM neural networks, RNNs, etc.). Training one or more data models based on the observations 330 may build an artificial query grammar and may account for the tedious grammatical structure encoded in global grammars of other systems. For example, based on a number of observations 330 across a number of natural language queries, the system may train a neural network that can predict primitives and higher order concepts present in a natural language query (e.g., based on commonly observed orders of primitives, higher order concepts, or both). The one or more data models may be used to improve the accuracy of labeling tokens and prioritize the next set of suggestions in an auto-complete feature. A first set of observations 330 may include the data set indicators 315 and be used to train a data set-specific data model that corresponds to one or more data sets. A second set of observations 330 may not include the data set indicators 315 and may be used to train a non-data set-specific (e.g., a universal) data model. In some cases, data set-specific data models may be trained for specific tenants, popular data sets, or both, and a more general data model may be trained for less popular data sets. Training general data models and data set-specific data models may support context-specific labeling and improve labeling accuracy.

Figure 4:
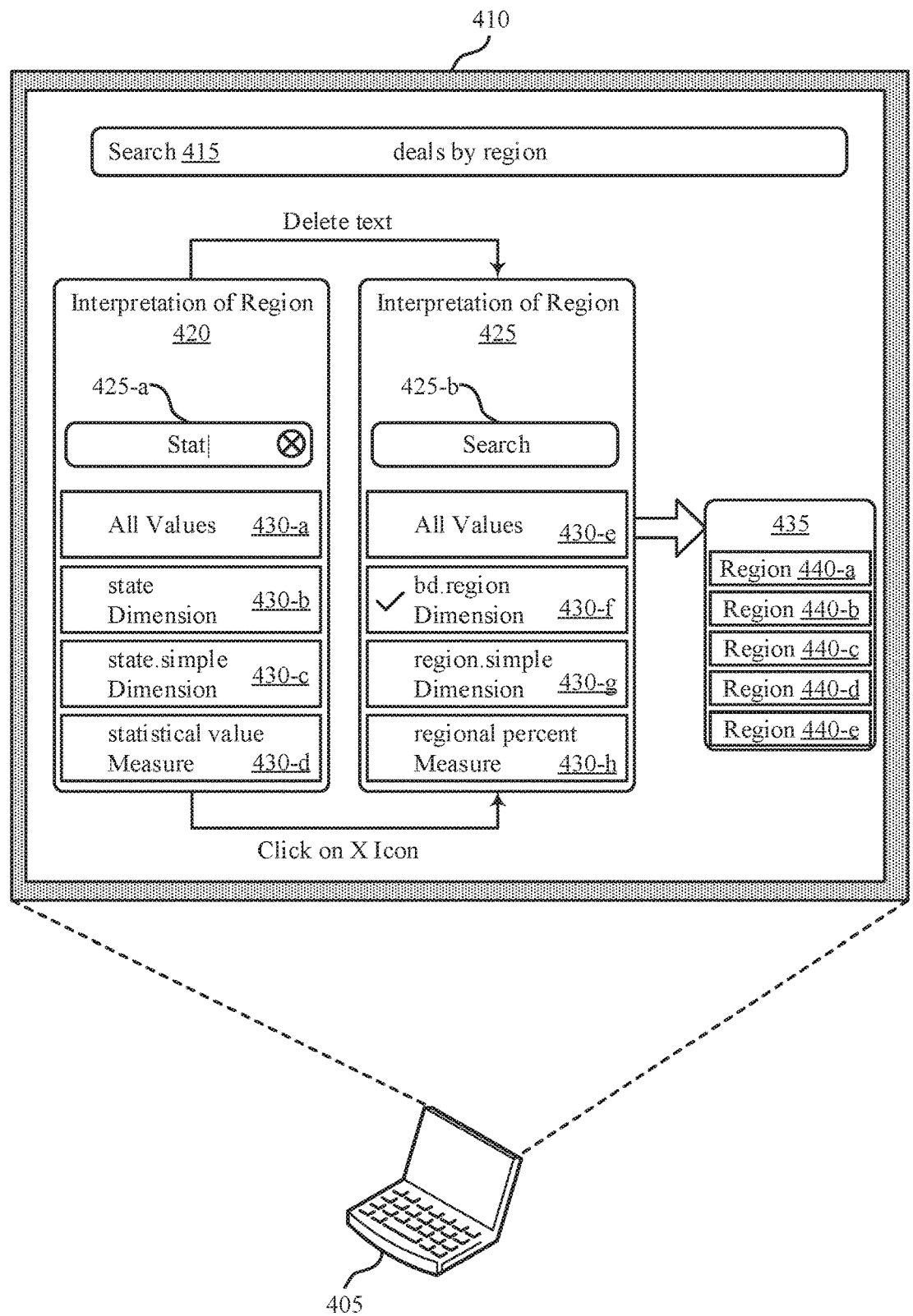
FIG. 4 illustrates an example of a token relabeling system that supports primitive-based query generation from natural language queries in accordance with aspects of the present disclosure.

FIG. 4 illustrates an example of a token relabeling system 400 that supports primitive-based query generation from natural language queries in accordance with aspects of the present disclosure. The token relabeling system 400 includes a user device 405 that support a user interface 410. The user interface 410 may support relabeling tokens, and the relabeled tokens may be used to train a neural network (e.g., to learn a grammatical structure or otherwise transform a natural language query into a database query) and improve token labeling.

As a non-limiting example, a user operating user device 405 may enter the phrase "deals by region" into the search field 415 of the user interface 410. The component 420 shows potential labels the user may use to relabel "region." For example, the user may enter search text (e.g., "Stat") into search field 425-a and the component 420 may display one or more potential labels based on the search text. For example the component 420 may display the label "state" of label category "dimension" in component 430-b, the label "state.simple" of label category "dimension" in component 430-c, and the label "statistical value" of label type "measure" in component 430-d. The user may view all label values by selecting on component 430-a. By deleting the search text or selecting the "X" icon in search field 425-a, the user may be presented the component 425.

The component 425 may not have any search text in the search field 425-b, and the component 425 may display the label "bd.region" of label category "dimension" in component 430-*f*, the label "region.simple" of label category "dimension" in component 430-*g*, and the label "regional percent" of label type "measure" in component 430-*h*. The component 425 may indicate that the term "region" currently corresponds to the label "bd.region" of label category "dimension" by the check mark displayed in component 430-*f*. For example, a neural network analyzing the natural language query "deals by region" may automatically determine that the word "region" corresponds to a "bd.region" dimension field. The user may view all values of the current label for the search term by selecting component 430-*e*. For example, the user may select component 430-*e* and be presented with the configuration of the "bd.region" label in component 435, and the user may alter the configuration of the "bd.region" label (e.g., add or remove data fields that are included in the label). For example, the component 435 may display possible values for a bd.region dimension, such as region values 440-*a*, 440-*b*, 440-*c*, 440-*d*, and 440-*e*. In some cases, the user may relabel a search term (e.g., a token) by selecting a component 430 for the search term.

The token relabeling system 400 may be used to train one or more data models for labeling natural language queries (e.g., RNNs) and/or one or more data models for ambiguity resolution (e.g., multi-layer perceptrons, deep neural networks, etc.). For example, the token relabeling system 400 may support supervised learning at a neural network based on user feedback to the automatically generated labels. In some cases, the one or more data models for labeling natural language queries may encode a grammatical structure and eliminate the need for an expert user to enumerate or define the grammatical structure. The one or more data models for labeling natural language queries may also be used to support an autocomplete feature, and the one or more data models for ambiguity resolution may be used to provide context specific suggestions to resolve ambiguous searches, terms, tokens, or the like.

Figure 5:
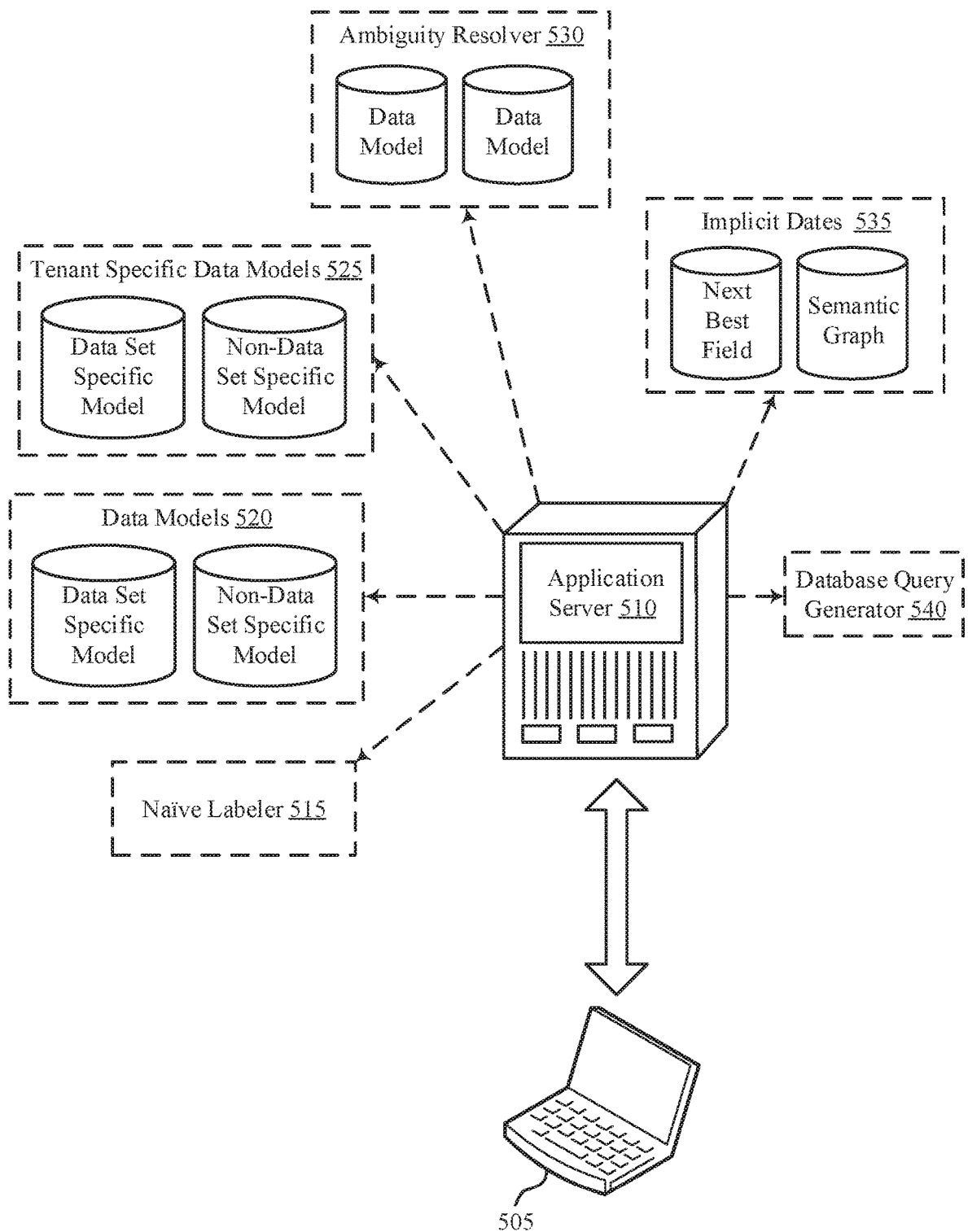
FIG. 5 illustrates an example of a system architecture that supports primitive-based query generation from natural language queries in accordance with aspects of the present disclosure.

FIG. 5 illustrates an example of a system architecture 500 that supports primitive-based query generation from natural language queries in accordance with aspects of the present disclosure. The system architecture 500 includes a user device 505 and an application server 510. One or more components of the applications server 510 may communicate with the naïve labeler 515, the data models 520, the tenant-specific data models 525, the ambiguity resolver 530, and the implicit dates 535. The system architecture 500 may include aspects of a system 100 as described with reference to FIG. 1. For example, the application server 510 may be an example or component of a data center 120 or an application server 205, and the user device 505 may be an example of a cloud client 105, a contact 110, a user device 210, or a user device 405.

A user operating the user device 505 may submit a natural language query to the application server 510, and the application server 510 may tokenize the query and label the tokens based on one or more services. For example, the application service may use the naïve labeler 515 to label the tokens of a query submitted by a new user. For example, starting with no or limited past usage and feedback, the naïve labeler may be used to label tokens. The naïve labeler may builder categories for each primitive type, iteratively apply each category type to each token, and assign a score (e.g., based on a [0-1] scoring system) to relatively rank labels for each token across categories. As described herein, the category for the number primitive may use a binary scoring system where tokens that can be parsed into a number are given a score of 1, and tokens that cannot be parsed into a number are given a score of 0. Other primitive categories may use a string based scoring system that uses a calculated string distance between known synonyms in each primitive category and the token. Some primitive categories may use the same procedure for calculating string distance, while some primitive categories may use different procedures. For example, a first group of primitive categories (e.g., measure, dimension, and field value) may generate scores based on a Jaro Winkler string distance, and a second group of primitive categories (e.g., numerical operator) may generate scores based on a Damerau-Levenshtein string distance.

In some cases, the naïve labeler 515 may be used to provide a starting point (e.g., an initial best guess) for users to teach the colloquial and language system of their business. For example, users may provide feedback by relabeling tokens or indicating (e.g., explicitly or implicitly) that tokens are labeled correctly, and the feedback may be used to train one or more data models to encode the information and learn the colloquial and language system associated with the user. In some examples, each instance of relabeling and initial labeling that is not corrected (e.g., implicitly indicated as correct) will be converted into multiple observations (e.g., a multiple observation training set). Relabeling may be recorded and used to build and train tenant-specific neural network models to encode user or tenant context, language, and data (e.g., in a multi-tenant database system).

The label feedback information (e.g., the multiple observations) may be used to train one or more data models. In some examples, the feedback information may be used to train one or more data models 520 (e.g., non-tenant specific data models, general data models). The feedback may be used without data set indicators (e.g., prefixes on each observation indicating a corresponding data set) to train a non-data set-specific data model (e.g., an RNN) and with data set indicators to train a data set-specific data model (e.g., an RNN) to handle database queries for information in a specific data set. In some additional or alternative examples, the feedback information may be used to train one or more data models 525 (e.g., tenant-specific data models). The feedback may be used without data set indicators (e.g., prefixes on each observation indicating a corresponding data set) to train a non-data set-specific data model (e.g., an RNN) for a specific tenant and with data set indicators to train a data set-specific data model (e.g., an RNN) for the specific tenant.

In some examples, the feedback information may be used to train one or more data models (e.g., multi-layer perceptrons, deep neural networks, convolutional neural networks, etc.). The ambiguity resolver 530 may allow users to teach the system sentence structure and how to interpret ambiguous terms or phrases (e.g., tokens or clusters of tokens). For example, the application server 510 may receive a first natural language query (e.g., "show me revenue by country") and a second natural language query (e.g., "show me shipped orders by country"). In some cases, data sets with product order may have multiple country fields (e.g., billing country, shipping country, etc.), so the term "country" of the two natural language queries may be ambiguous. For example, the user may want to aggregate "revenue" by "billing country" and "orders" by "shipping country," and the ambiguity resolver 530 may use the context of the term "country" to correctly interpret the term.

In such an example, country may be a dimension field (e.g., the primitive category "dimension") and recent and orders (count) may be measure fields (e.g., the primitive category "measure"). The ambiguity resolver 530 may record corrected relabeling and initial labeling that is not corrected (e.g., assumed to be accurate). For example, because the token "country" corresponds to a dimension field and may be considered ambiguous, the ambiguity resolver 530 may record a first set of observations, with each observation including the first "n" (e.g., 3) dimensions to predict the measure field. As an example, a first observation may include a single dimension field to predict the measure field (e.g., <data set>, <billing_country>, <none>, <none>->revenue), a second observation may include two dimension fields to predict the measure field (e.g., <data set>, <billing_country>, <billing_state>, <none>->revenue), and a third observation may include one dimension field to predict the measure field (e.g., <data set>, <shipping_country>, <none>, <none>->count). In some cases the ambiguity resolver 530 may record a second set of observations that includes the inverse of the observations in the first set of observations. For example the second observation may include the first "n" (e.g., 3) measure fields to predict the dimension field. As an example, a first observation may include one measure field to predict the dimension field (e.g., <data set>, <revenue>, <none>, <none>->billing_country), a second observation may include one measure field to predict the dimension field (e.g., <data set>, <revenue>, <none>, <none>->billing_state), and a third observation may include one measure field to predict the dimension field (e.g., <data set>, <count>, <none>, <none>->shipping_country). The first set of observations may be added to a first data model and the second set of observations may be added to a second data model. One or more data models of the ambiguity resolver 530 may use contextual information to resolve query ambiguity and improve user experience. Additionally or alternatively, the ambiguity may be resolved differently for different data sets, different tenants, or a combination thereof.

The service for implicit dates 535 may determine one or more date fields based on a natural language query and append the one or more determined date fields to token labeling. For example, a user may enter the query "deals this month," and the service for implicit dates 535 may determine the current month. As another examples, a user may enter the query "deals last month," and the service for implicit data 535 may determine the previous month. For example, the service for implicit dates 535 may use a current timestamp as reference to determine the meaning of a natural language query. In some cases, the service for implicit dates 535 may query a next best field model for recommended date fields based on the natural language query. The service for implicit dates 535 may, in some cases, use a semantic graph to identify the most popular date field. The one or more determined date fields may be appended to token labeling to improve labeling accuracy, identify appropriate date filters, and improve database query generation.

The database query generator 540 may generate a database query based on the natural language query. For example, the database query generator 540 may identify one or more higher order concepts based on applying procedures or heuristics to search the labeled tokens and generate a database query based on the labeled tokens and higher order concepts. The higher order concepts may corresponds to embedded query concepts such as a calculation, a measure range, a date range, etc. In some cases, the procedures or heuristics may include identifying token labels corresponding to a first primitive category (e.g., measure field, number, date part, number) and then identifying token labels corresponding to a second primitive category (e.g., aggregation, numerical operator, date modifier, sort, etc.) within some proximity of a token labeled with the first primitive category. For example, the database query generator 540 may identify tokens corresponding to the label "measure field" and scan outward from the identified tokens to identify tokens corresponding to the label "aggregation" to determine a "calculation" higher order concept. Scanning outward may be based on all tokens or all tokens with labels (e.g., skipping unlabeled tokens) when considering proximity. The higher order concepts may be put together to form a database query. In some cases, the database query may correspond to an intermediate data agnostic representation of the query (e.g., compact form). Representing the database query in a data agnostic form may allow the techniques described herein to be used to generate database queries for different types of databases, which may support using the learned querying patterns and preferences to improve user experience across a vast array of services.

For example, the system may receive a natural language query "regions by sum of amount and open deals." The system may use one or more of the techniques described herein to label "sum" as an aggregation primitive and "amount" and "open deals" as measure fields (e.g., based on a specific data set of interest). The system may further use the higher order calculation heuristic to scan outward from the measure fields (e.g., within a given threshold proximity) for an aggregation function. As such, the system may generate a database query that includes both a sum of amount and a sum of open deals (e.g., based on identifying "sum" labeled with the aggregation primitive within a threshold distance from both of the measure fields "amount" and "open deals"). As such, the generated database query may retrieve data from a data set include region data, where the query performs the sum operation on amount and open deals fields in the data set. Accordingly, the query results may match the intent of the natural language query, despite the natural language query not matching a structured grammar or known database query language.

Figure 6:
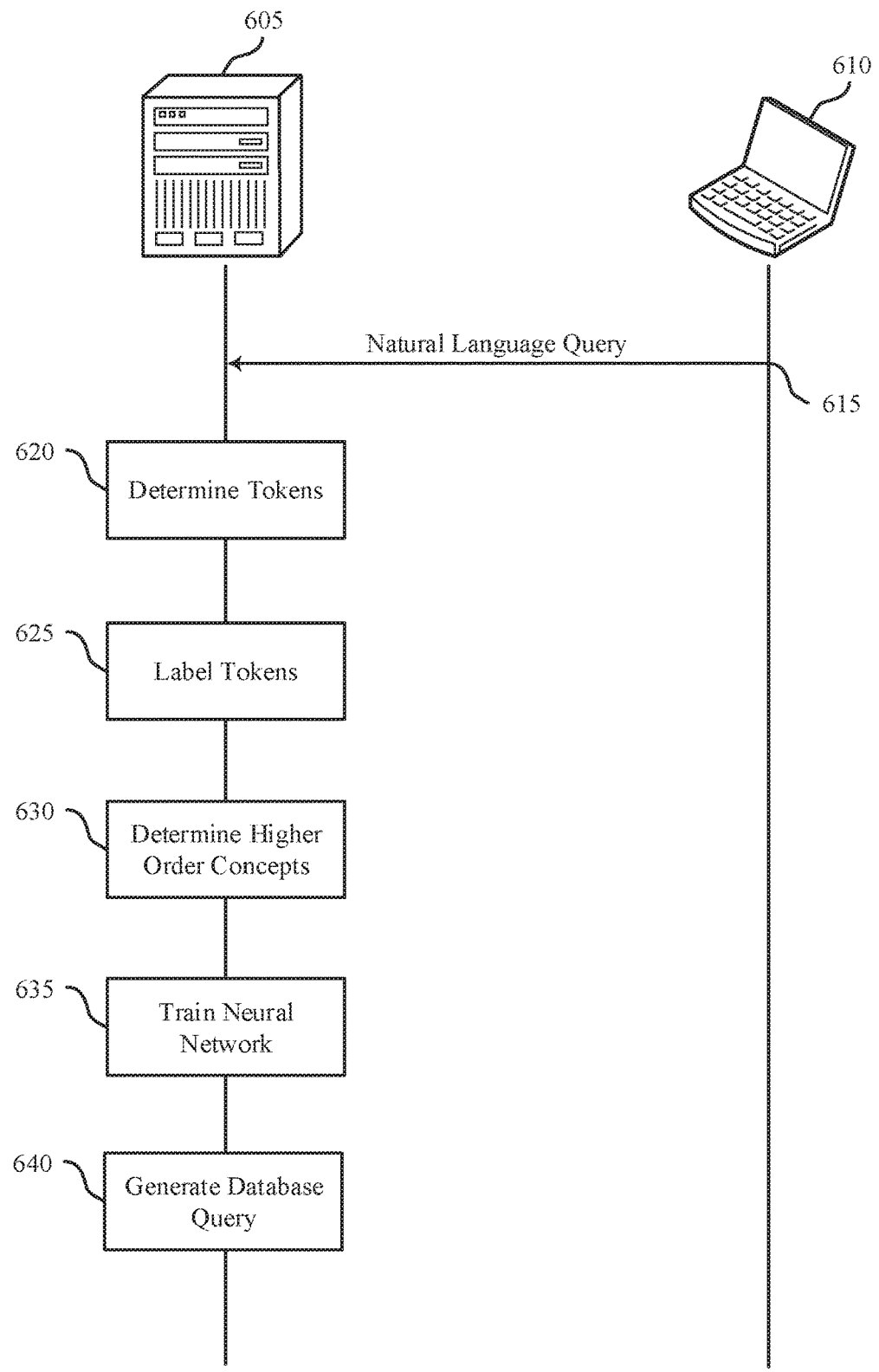
FIG. 6 illustrates an example of a process flow that supports primitive-based query generation from natural language queries in accordance with aspects of the present disclosure.

FIG. 6 illustrates an example of a process flow 600 that supports primitive-based query generation from natural language queries in accordance with aspects of the present disclosure. The process flow 600 includes an application server 605 and a user device 610, which may be examples of the corresponding devices described with reference to FIGS. 1 through 5. The application server 605 may learn a grammatical structure to convert a natural language query into a database query, thereby maintaining a grammar that evolves with system use and improves a user search experience. Alternative examples of the following may be implemented, where some steps are performed in a different order than described or are not performed at all. In some cases, steps may include additional features not mentioned below, or further steps may be added.

At 615, the application server 615 may receive a natural language query. In some cases, the natural language query may be submitted by a user operating the user device 610, and the natural language query may correspond to an unstructured query. The natural language query may be associated with a subset of data sets (e.g., a group of database tables) of a set of multiple data sets (e.g., multiple database tables configured in a database system).

At 620, the application server 605 may determine a set of tokens included in the natural language query. For example, the application server 605 may split the natural language query into a set of words, where each word corresponds to a token.

At 625, the application server 605 may label one or more tokens of the set of tokens with one or more primitives from a set of supported primitives associated with the subset of data sets. In some examples, the set of supported primitives may be tenant-specific (e.g., based on custom objects for a tenant), data set-specific (e.g., based on specific fields and/or values in a specific data set), or a combination thereof. The application server 605 may analyze metadata for a tenant, data set, query, or some combination thereof to determine the supported set of primitives for labeling the natural language query. In some examples, the application server 605 may identify a set of primitives that are associated with the tokens and label one or more tokens with one or more labels of the set of primitives.

At 630, the application server 605 may determine a set of higher order concepts based on the one or more labeled tokens. In some cases, the higher order concepts may correspond to query operations and/or query conditions, and each higher order concept may include multiple primitives. In some cases, a higher order concept in a natural language query may correspond to a filter condition, a limit condition, a sorting condition, an operation to perform, or any combination thereof in a database query.

At 635, the application server 605 may train a neural network to learn a grammatical structure of the natural language query based on the one or more labeled tokens and/or the set of higher order concepts. In some case, the application server 605 may train multiple neural networks or provide training examples (e.g., observations) to multiple neural networks. For example, the application server 605 may train a tenant-specific RNN and a data set-specific multi-layer perceptron based on the one or more labeled tokens.

At 640, the application server 605 may generate a database query (or a representation of a database query) for querying a database system. The database query may be generated based on the one or more labeled tokens, the set of higher order concepts, and the neural network. For example, the neural network may suggest one or more labels for the one or more labeled tokens, and the application server 605 may user the higher order concepts to identify query concepts and the one or more labeled tokens to identify data fields.

Figure 7:
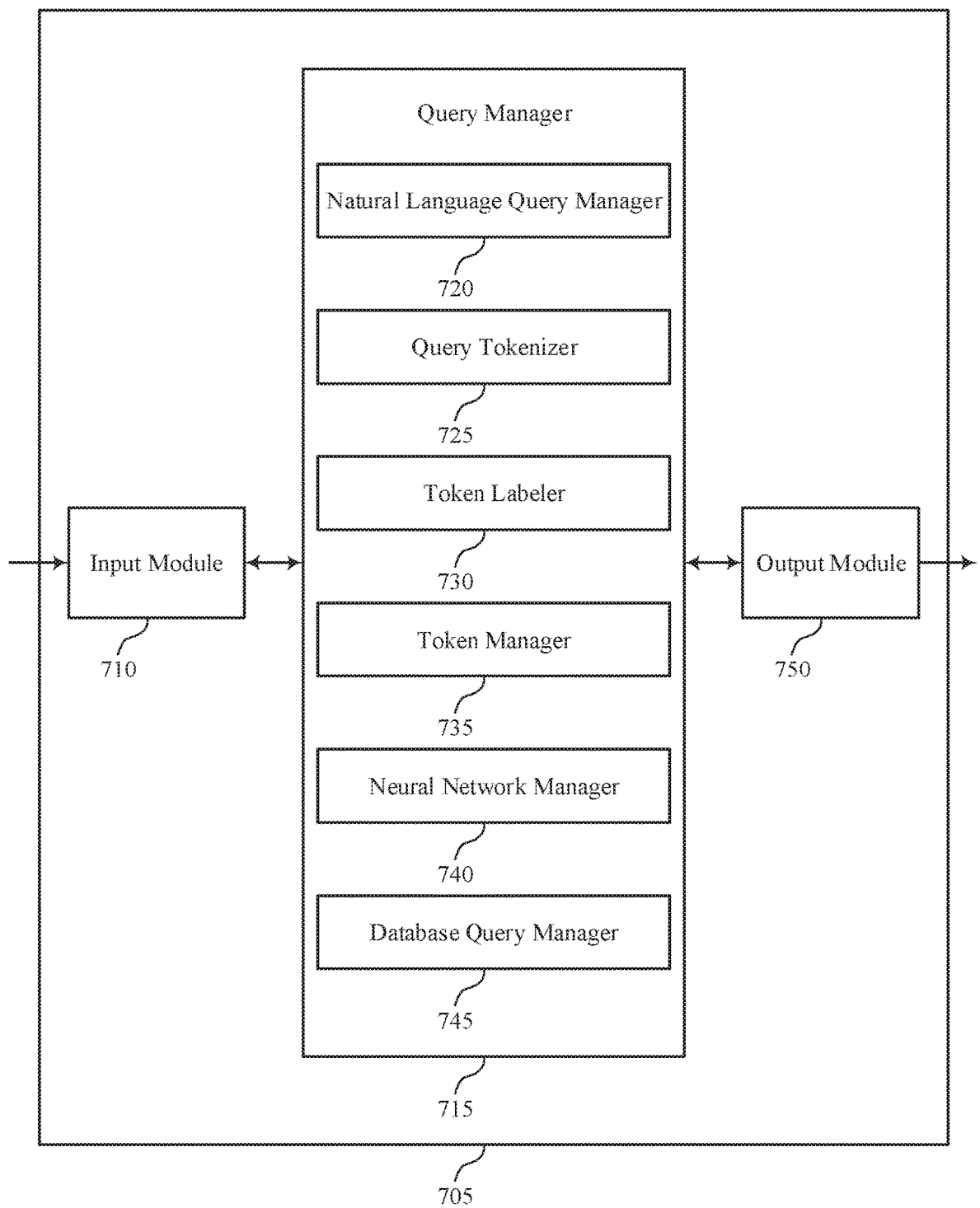
FIG. 7 shows a block diagram of an apparatus that supports primitive-based query generation from natural language queries in accordance with aspects of the present disclosure.

FIG. 7 shows a block diagram 700 of an apparatus 705 that supports primitive-based query generation from natural language queries in accordance with aspects of the present disclosure. The apparatus 705 may include an input module 710, a query manager 715, and an output module 750. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the query manager 715 to support primitive-based query generation from natural language queries. In some cases, the input module 710 may be a component of an input/output (I/O) controller 915 as described with reference to FIG. 9.

The query manager 715 may include a natural language query manager 720, a query tokenizer 725, a token labeler 730, a token manager 735, a neural network manager 740, and a database query manager 745. The query manager 715 may be an example of aspects of the query manager 805 or 910 described with reference to FIGS. 8 and 9.

The query manager 715 and/or at least some of its various sub-components may be implemented in hardware, software executed by a processor, firmware, or any combination thereof. If implemented in software executed by a processor, the functions of the query manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The query manager 715 and/or at least some of its various sub-components may be physically located at various positions, including being distributed such that portions of functions are implemented at different physical locations by one or more physical devices. In some examples, the query manager 715 and/or at least some of its various sub-components may be a separate and distinct component in accordance with various aspects of the present disclosure. In other examples, the query manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The query manager 715 may be implemented at a database system. The natural language query manager 720 may receive a natural language query associated with a subset of data sets of a set of data sets stored in the database system. The query tokenizer 725 may determine a set of tokens included in the natural language query. The token labeler 730 may label one or more tokens of the set of tokens with one or more primitives from a set of supported primitives associated with the subset of data sets. The token manager 735 may determine, based on the one or more labeled tokens, a set of higher order concepts corresponding to query operations, query conditions, or both, where each higher order concept includes multiple primitives of the set of supported primitives. The neural network manager 740 may train a neural network to learn a grammatical structure of the natural language query based on the one or more labeled tokens, the determined set of higher order concepts, or both. The database query manager 745 may generate a database query for querying the database system based on the one or more labeled tokens, the determined set of higher order concepts, and the neural network.

The output module 750 may manage output signals for the apparatus 705. For example, the output module 750 may receive signals from other components of the apparatus 705, such as the query manager 715, and may transmit these signals to other components or devices. In some specific examples, the output module 750 may transmit output signals for display in a user interface, for storage in a database or data store, for further processing at a server or server cluster, or for any other processes at any number of devices or systems. In some cases, the output module 750 may be a component of an I/O controller 915 as described with reference to FIG. 9.

Figure 8:
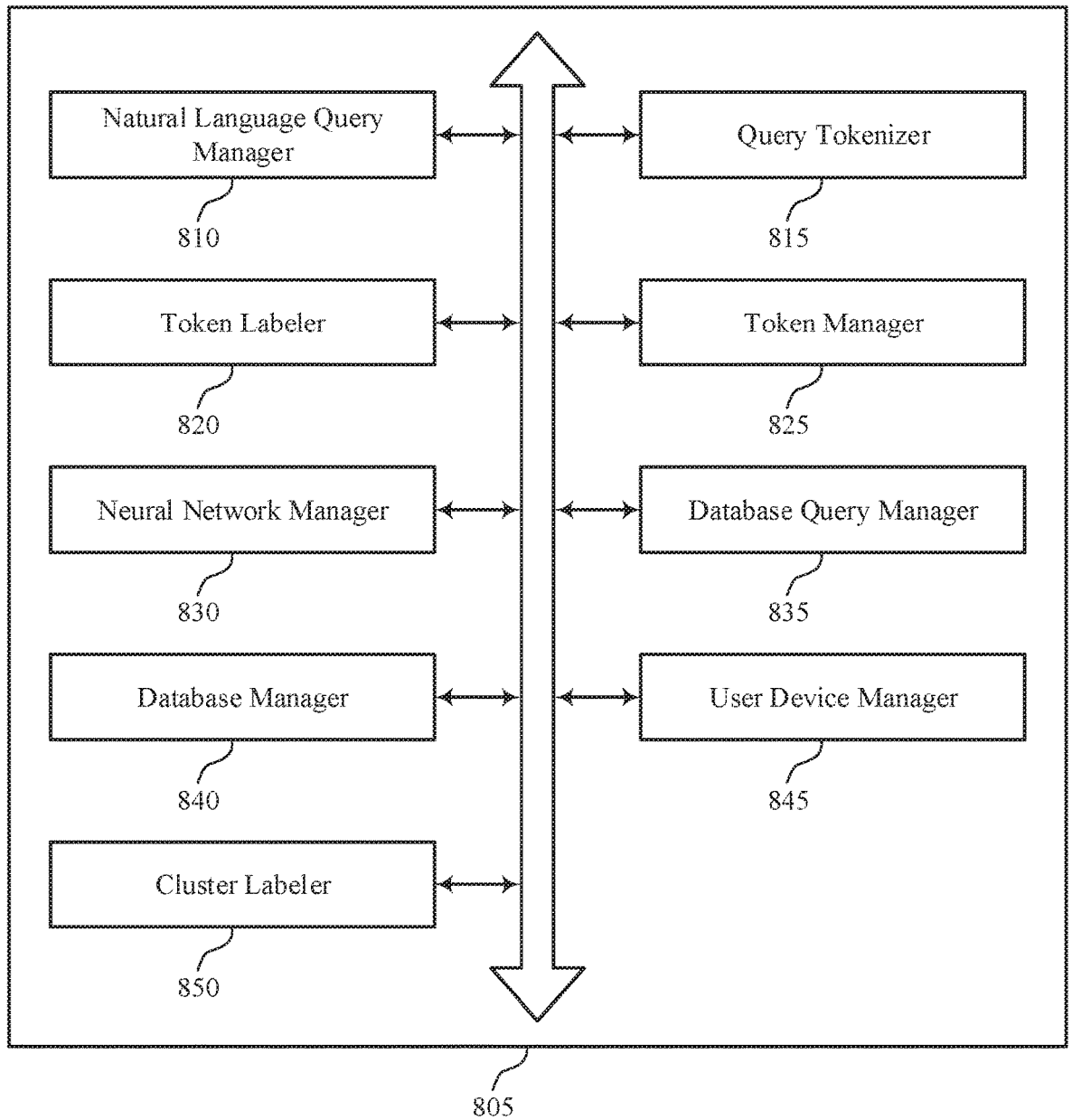
FIG. 8 shows a block diagram of a query manager that supports primitive-based query generation from natural language queries in accordance with aspects of the present disclosure.

FIG. 8 shows a block diagram 800 of a query manager 805 that supports primitive-based query generation from natural language queries in accordance with aspects of the present disclosure. The query manager 805 may be an example of aspects of a query manager 715 or a query manager 910 described herein. The query manager 805 may include a natural language query manager 810, a query tokenizer 815, a token labeler 820, a token manager 825, a neural network manager 830, a database query manager 835, a database manager 840, a user device manager 845, and a cluster labeler 850. Each of these components may communicate, directly or indirectly, with one another (e.g., via one or more buses). The query manager 805 may support querying a database system.

The natural language query manager 810 may receive a natural language query associated with a subset of data sets of a set of data sets stored in the database system.

The query tokenizer 815 may determine a set of tokens included in the natural language query. In some examples, to determine the set of tokens, the query tokenizer 815 may perform a word breaking procedure on the natural language query to determine a set of words, convert the set of words into a common language using a Unicode transformation format 8-bit encoding, and determine the set of tokens based on the converted set of words. In some examples, the cluster labeler 850 may cluster a set of adjacent words of the converted set of words and may determine whether to label the clustered set of adjacent words with a primitive from the set of supported primitives.

The token labeler 820 may label one or more tokens of the set of tokens with one or more primitives from a set of supported primitives associated with the subset of data sets. The user device manager 845 may send, for display at a user device, the one or more labeled tokens of the set of tokens. In some examples, the user device manager 845 may receive, from the user device, a user input indicating an updated label corresponding to a token of the set of tokens. In some examples, the token labeler 820 may relabel the token with the updated label.

In some examples, labeling the one or more tokens with the one or more primitives may involve the token labeler 820 comparing a first token to a set of terms associated with a first primitive, determining a string distance value between the first token and at least one term of the set of terms based on the comparing, and ranking an applicability of the first primitive to the first token based on the string distance value, where the first token is labeled with the first primitive based on the ranked applicability satisfying a threshold. In some such examples, the token labeler 820 may determine the set of terms associated with the first primitive based on metadata for the subset of data sets, a statistic for the subset of data sets, or a combination thereof. In some cases, the set of supported primitives includes a number, a numerical operator, an aggregation, a measure field, a dimension field, a field value, a date part, a date modifier, a sort operation, or a combination thereof.

The token manager 825 may determine, based on the one or more labeled tokens, a set of higher order concepts corresponding to query operations, query conditions, or both, where each higher order concept includes multiple primitives of the set of supported primitives. In some cases, the set of higher order concepts includes a calculation, a measure range, a date range, a limit condition, or a combination thereof.

The neural network manager 830 may train a neural network to learn a grammatical structure of the natural language query based on the one or more labeled tokens, the determined set of higher order concepts, or both. In some examples, the neural network manager 830 may train the neural network based on relabeling the token.

In some examples, the token manager 825 may identify a subset of the one or more labeled tokens, where each token of the subset of the one or more labeled tokens corresponds to a first primitive type, where the neural network is trained based on the subset of the one or more labeled tokens. In some cases, the first primitive type corresponds to a dimension field that is associated with the subset of data sets or a measure field that is associated with the subset of data sets.

The database query manager 835 may generate a database query for querying the database system based on the one or more labeled tokens, the determined set of higher order concepts, and the neural network.

In some examples, the token manager 825 may identify a token of the one or more labeled tokens that is labeled with a temporal primitive. In some such examples, the token manager 825 may predict a date field associated with the subset of data sets based on the temporal primitive, the neural network, or a combination thereof, where the database query is generated based on the predicted date field.

In some cases, the database system may be an example of a multi-tenant database system, and the neural network may be an example of a first tenant-specific neural network corresponding to a first tenant of the multi-tenant database system associated with the subset of data sets. In some examples, the natural language query manager 810 may receive a second natural language query associated with a second subset of data sets of the set of data sets stored in the multi-tenant database system. In some such examples, the database query manager 835 may generate a second database query for querying the multi-tenant database system based on the second natural language query and a second tenant-specific neural network corresponding to a second tenant of the multi-tenant database system associated with the second subset of data sets, where the first tenant-specific neural network is different from the second tenant-specific neural network.

In some cases, the neural network may be an example of a data set-specific neural network corresponding to the subset of data sets. In some such cases, the neural network manager 830 may train a universal neural network for the set of data sets to learn a second grammatical structure of the natural language query based on the one or more labeled tokens, the determined set of higher order concepts, or both. The database query manager 835 may select to use the data set-specific neural network, the universal neural network, or a combination thereof to generate the database query based on the natural language query.

In some cases, the database system may be an example of a multi-tenant database system, and the neural network may be an example of a tenant-specific neural network corresponding to a tenant of a set of tenants of the multi-tenant database system. In some such cases, the neural network manager 830 may train a tenant-agnostic neural network for the set of tenants to learn a second grammatical structure of the natural language query based on the one or more labeled tokens, the determined set of higher order concepts, or both, where the database query may be generated based on the tenant-specific neural network and the tenant-agnostic neural network.

The database manager 840 may manage one or more databases. For example, the database manager 840 may include or otherwise manage a multi-tenant database system.

Figure 9:
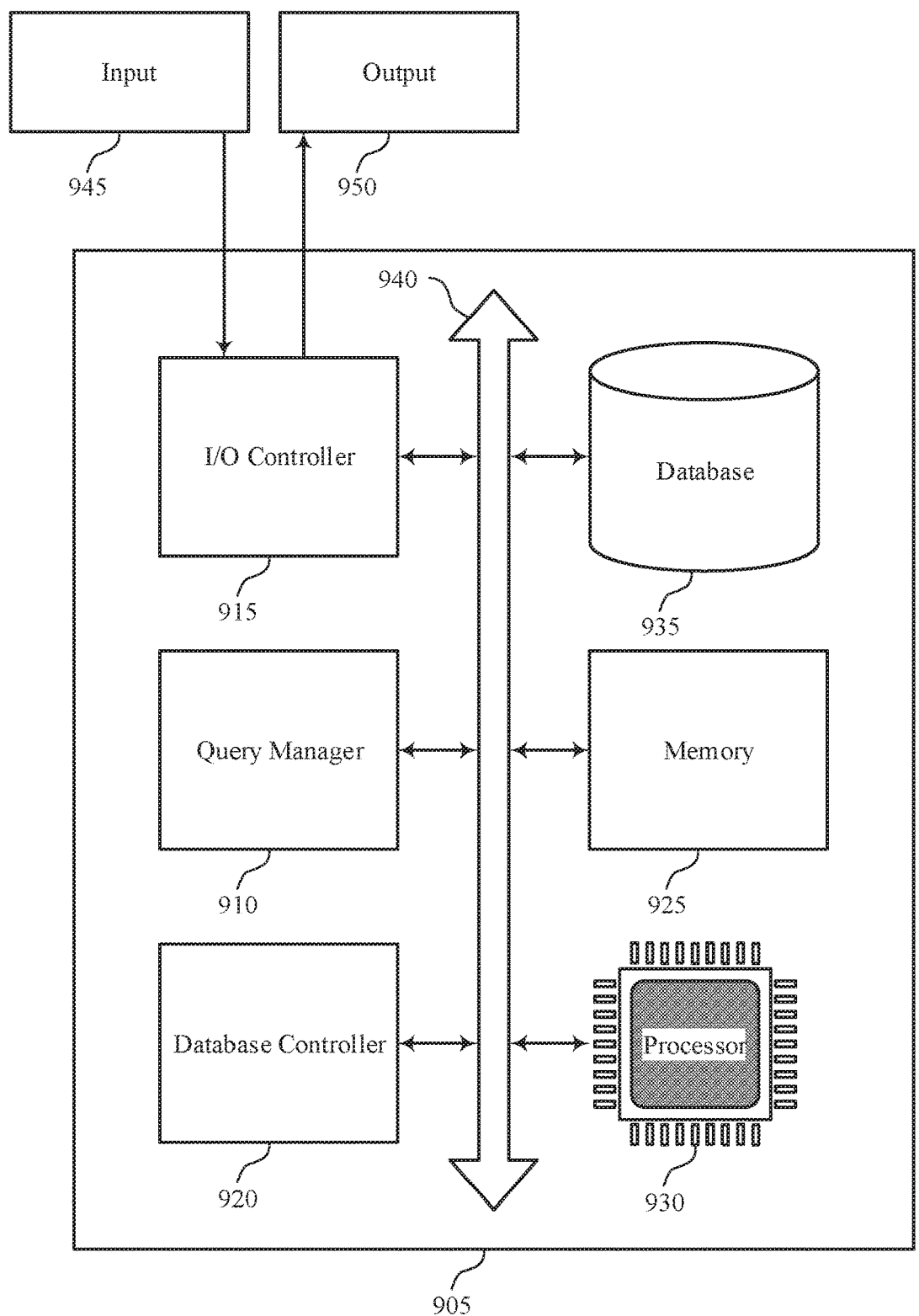
FIG. 9 shows a diagram of a system including a device that supports primitive-based query generation from natural language queries in accordance with aspects of the present disclosure.

FIG. 9 shows a diagram of a system 900 including a device 905 that supports primitive-based query generation from natural language queries in accordance with aspects of the present disclosure. The device 905 may be an example of or include the components of an application server or an apparatus 705 as described herein. The device 905 may include components for bi-directional data communications including components for transmitting and receiving communications, including a query manager 910, an I/O controller 915, a database controller 920, memory 925, a processor 930, and a database 935. These components may be in electronic communication via one or more buses (e.g., bus 940).

The query manager 910 may be an example of a query manager 715 or 805 as described herein. For example, the query manager 910 may perform any of the methods or processes described above with reference to FIGS. 7 and 8. In some cases, the query manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting primitive-based query generation from natural language queries).

Figure 10:
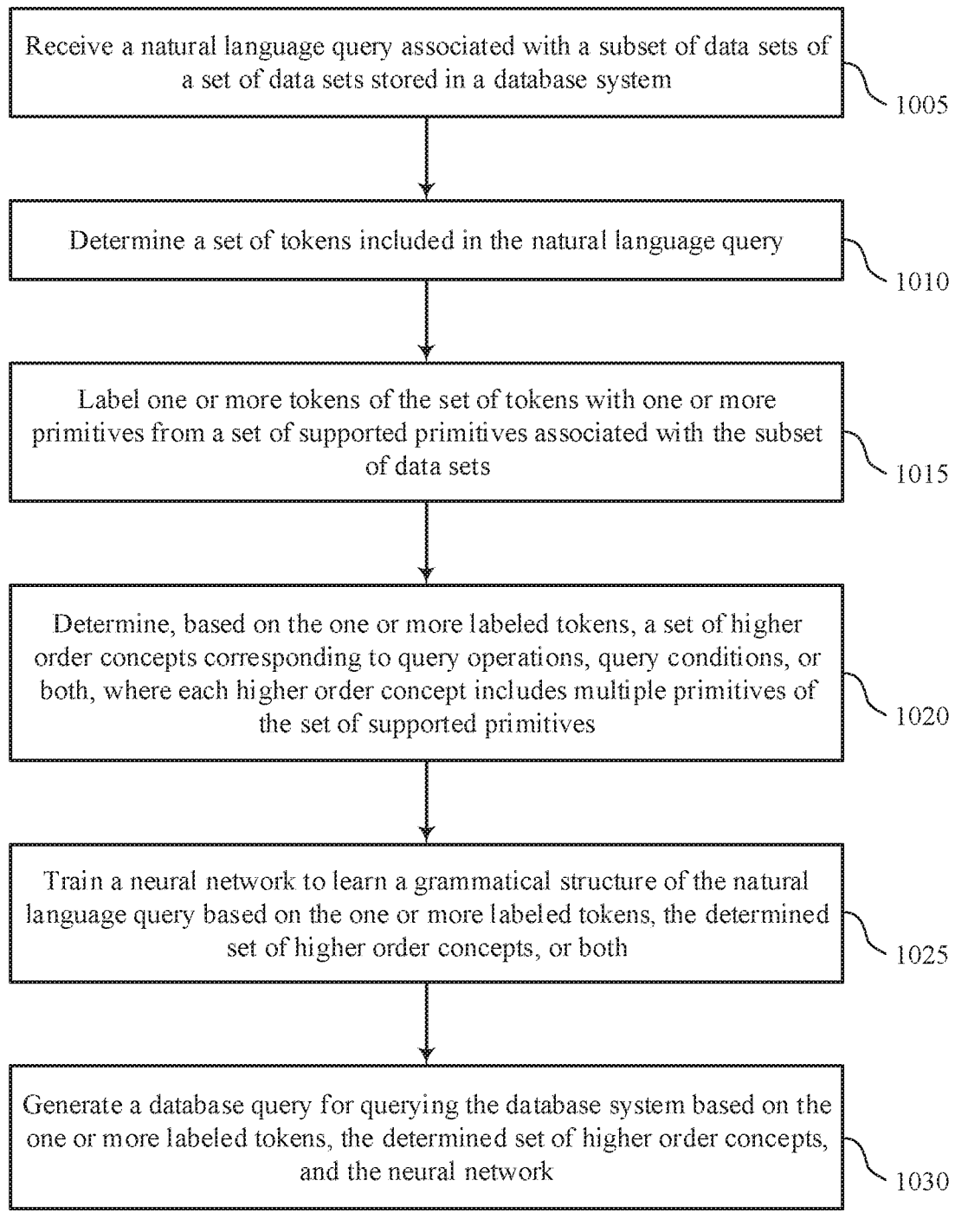
FIGS. 10 through 12 show flowcharts illustrating methods that support primitive-based query generation from natural language queries in accordance with aspects of the present disclosure.

FIG. 10 shows a flowchart illustrating a method 1000 that supports primitive-based query generation from natural language queries in accordance with aspects of the present disclosure. The operations of method 1000 may be implemented by a server or its components as described herein. For example, the operations of method 1000 may be performed by a query manager as described with reference to FIGS. 7 through 9. In some examples, a server may execute a set of instructions to control the functional elements of the server to perform the functions described below. Additionally or alternatively, a server may perform aspects of the functions described below using special-purpose hardware.

At 1005, the server may receive a natural language query associated with a subset of data sets of a set of data sets stored in a database system. The operations of 1005 may be performed according to the methods described herein. In some examples, aspects of the operations of 1005 may be performed by a natural language query manager as described with reference to FIGS. 7 through 9.

At 1010, the server may determine a set of tokens included in the natural language query. The operations of 1010 may be performed according to the methods described herein. In some examples, aspects of the operations of 1010 may be performed by a query tokenizer as described with reference to FIGS. 7 through 9.

At 1015, the server may label one or more tokens of the set of tokens with one or more primitives from a set of supported primitives associated with the subset of data sets. The operations of 1015 may be performed according to the methods described herein. In some examples, aspects of the operations of 1015 may be performed by a token labeler as described with reference to FIGS. 7 through 9.

At 1020, the server may determine, based on the one or more labeled tokens, a set of higher order concepts corresponding to query operations, query conditions, or both, where each higher order concept includes multiple primitives of the set of supported primitives. The operations of 1020 may be performed according to the methods described herein. In some examples, aspects of the operations of 1020 may be performed by a token manager as described with reference to FIGS. 7 through 9.

At 1025, the server may train a neural network to learn a grammatical structure of the natural language query based on the one or more labeled tokens, the determined set of higher order concepts, or both. The operations of 1025 may be performed according to the methods described herein. In some examples, aspects of the operations of 1025 may be performed by a neural network manager as described with reference to FIGS. 7 through 9.

At 1030, the server may generate a database query for querying the database system based on the one or more labeled tokens, the determined set of higher order concepts, and the neural network. The operations of 1030 may be performed according to the methods described herein. In some examples, aspects of the operations of 1030 may be performed by a database query manager as described with reference to FIGS. 7 through 9.

Figure 11:
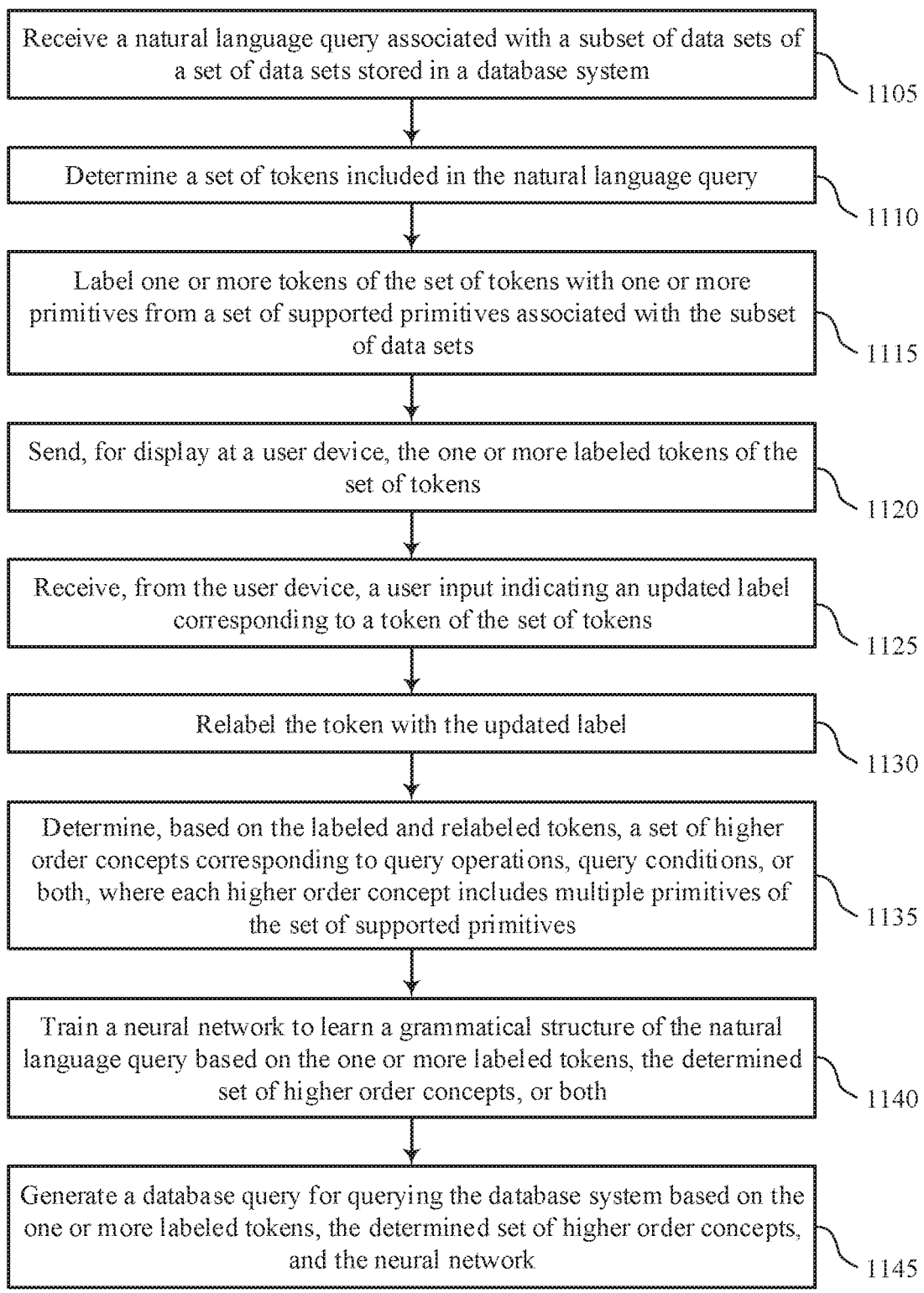

FIG. 11 shows a flowchart illustrating a method 1100 that supports primitive-based query generation from natural language queries in accordance with aspects of the present disclosure. The operations of method 1100 may be implemented by a server or its components as described herein. For example, the operations of method 1100 may be performed by a query manager as described with reference to FIGS. 7 through 9. In some examples, a server may execute a set of instructions to control the functional elements of the server to perform the functions described below. Additionally or alternatively, a server may perform aspects of the functions described below using special-purpose hardware.

At 1105, the server may receive a natural language query associated with a subset of data sets of a set of data sets stored in the database system. The operations of 1105 may be performed according to the methods described herein. In some examples, aspects of the operations of 1105 may be performed by a natural language query manager as described with reference to FIGS. 7 through 9.

At 1110, the server may determine a set of tokens included in the natural language query. The operations of 1110 may be performed according to the methods described herein. In some examples, aspects of the operations of 1110 may be performed by a query tokenizer as described with reference to FIGS. 7 through 9.

At 1115, the server may label one or more tokens of the set of tokens with one or more primitives from a set of supported primitives associated with the subset of data sets. The operations of 1115 may be performed according to the methods described herein. In some examples, aspects of the operations of 1115 may be performed by a token labeler as described with reference to FIGS. 7 through 9.

At 1120, the server may send, for display at a user device, the one or more labeled tokens of the set of tokens. The operations of 1120 may be performed according to the methods described herein. In some examples, aspects of the operations of 1120 may be performed by a user device manager as described with reference to FIGS. 7 through 9.

At 1125, the server may receive, from the user device, a user input indicating an updated label corresponding to a token of the set of tokens. The operations of 1125 may be performed according to the methods described herein. In some examples, aspects of the operations of 1125 may be performed by a user device manager as described with reference to FIGS. 7 through 9.

At 1130, the server may relabel the token with the updated label. The operations of 1130 may be performed according to the methods described herein. In some examples, aspects of the operations of 1130 may be performed by a token labeler as described with reference to FIGS. 7 through 9.

At 1135, the server may determine, based on the one or more labeled tokens (e.g., including one or more relabeled tokens), a set of higher order concepts corresponding to query operations, query conditions, or both, where each higher order concept includes multiple primitives of the set of supported primitives. The operations of 1135 may be performed according to the methods described herein. In some examples, aspects of the operations of 1135 may be performed by a token manager as described with reference to FIGS. 7 through 9.

At 1140, the server may train a neural network to learn a grammatical structure of the natural language query based on the one or more labeled tokens, the determined set of higher order concepts, or both. The operations of 1140 may be performed according to the methods described herein. In some examples, aspects of the operations of 1140 may be performed by a neural network manager as described with reference to FIGS. 7 through 9.

At 1145, the server may generate a database query for querying the database system based on the one or more labeled tokens, the determined set of higher order concepts, and the neural network. The operations of 1145 may be performed according to the methods described herein. In some examples, aspects of the operations of 1145 may be performed by a database query manager as described with reference to FIGS. 7 through 9.

Figure 12:
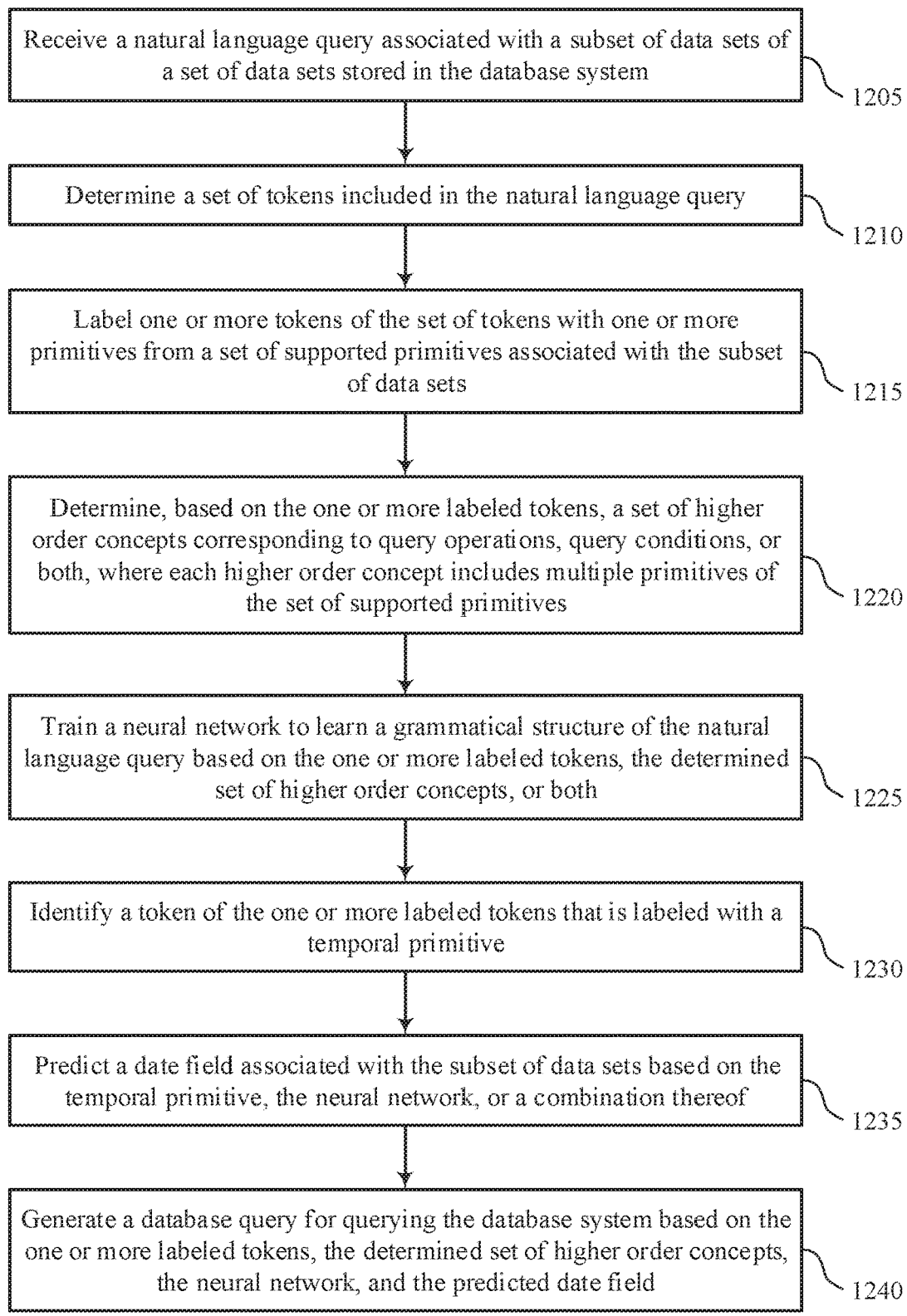

FIG. 12 shows a flowchart illustrating a method 1200 that supports primitive-based query generation from natural language queries in accordance with aspects of the present disclosure. The operations of method 1200 may be implemented by a server or its components as described herein. For example, the operations of method 1200 may be performed by a query manager as described with reference to FIGS. 7 through 9. In some examples, a server may execute a set of instructions to control the functional elements of the server to perform the functions described below. Additionally or alternatively, a server may perform aspects of the functions described below using special-purpose hardware.

At 1205, the server may receive a natural language query associated with a subset of data sets of a set of data sets stored in the database system. The operations of 1205 may be performed according to the methods described herein. In some examples, aspects of the operations of 1205 may be performed by a natural language query manager as described with reference to FIGS. 7 through 9.

At 1210, the server may determine a set of tokens included in the natural language query. The operations of 1210 may be performed according to the methods described herein. In some examples, aspects of the operations of 1210 may be performed by a query tokenizer as described with reference to FIGS. 7 through 9.

At 1215, the server may label one or more tokens of the set of tokens with one or more primitives from a set of supported primitives associated with the subset of data sets. The operations of 1215 may be performed according to the methods described herein. In some examples, aspects of the operations of 1215 may be performed by a token labeler as described with reference to FIGS. 7 through 9.

At 1220, the server may determine, based on the one or more labeled tokens, a set of higher order concepts corresponding to query operations, query conditions, or both, where each higher order concept includes multiple primitives of the set of supported primitives. The operations of 1220 may be performed according to the methods described herein. In some examples, aspects of the operations of 1220 may be performed by a token manager as described with reference to FIGS. 7 through 9.

At 1225, the server may train a neural network to learn a grammatical structure of the natural language query based on the one or more labeled tokens, the determined set of higher order concepts, or both. The operations of 1225 may be performed according to the methods described herein. In some examples, aspects of the operations of 1225 may be performed by a neural network manager as described with reference to FIGS. 7 through 9.

At 1230, the server may identify a token of the one or more labeled tokens that is labeled with a temporal primitive. The operations of 1230 may be performed according to the methods described herein. In some examples, aspects of the operations of 1230 may be performed by a token manager as described with reference to FIGS. 7 through 9.

At 1235, the server may predict a date field associated with the subset of data sets based on the temporal primitive, the neural network, or a combination thereof. The operations of 1235 may be performed according to the methods described herein. In some examples, aspects of the operations of 1235 may be performed by a token manager as described with reference to FIGS. 7 through 9.

At 1240, the server may generate a database query for querying the database system based on the one or more labeled tokens, the determined set of higher order concepts, the neural network, and the predicted date field. The operations of 1240 may be performed according to the methods described herein. In some examples, aspects of the operations of 1240 may be performed by a database query manager as described with reference to FIGS. 7 through 9.

A method for querying a database system is described. The method may include receiving a natural language query associated with a subset of data sets of a set of data sets stored in the database system, determining a set of tokens included in the natural language query, labeling one or more tokens of the set of tokens with one or more primitives from a set of supported primitives associated with the subset of data sets, determining, based on the one or more labeled tokens, a set of higher order concepts corresponding to query operations, query conditions, or both, where each higher order concept includes multiple primitives of the set of supported primitives, training a neural network to learn a grammatical structure of the natural language query based on the one or more labeled tokens, the determined set of higher order concepts, or both, and generating a database query for querying the database system based on the one or more labeled tokens, the determined set of higher order concepts, and the neural network.

An apparatus for querying a database system is described. The apparatus may include a processor, memory coupled with the processor, and instructions stored in the memory. The instructions may be executable by the processor to cause the apparatus to receive a natural language query associated with a subset of data sets of a set of data sets stored in the database system, determine a set of tokens included in the natural language query, label one or more tokens of the set of tokens with one or more primitives from a set of supported primitives associated with the subset of data sets, determine, based on the one or more labeled tokens, a set of higher order concepts corresponding to query operations, query conditions, or both, where each higher order concept includes multiple primitives of the set of supported primitives, train a neural network to learn a grammatical structure of the natural language query based on the one or more labeled tokens, the determined set of higher order concepts, or both, and generate a database query for querying the database system based on the one or more labeled tokens, the determined set of higher order concepts, and the neural network.

Another apparatus for querying a database system is described. The apparatus may include means for receiving a natural language query associated with a subset of data sets of a set of data sets stored in the database system, determining a set of tokens included in the natural language query, labeling one or more tokens of the set of tokens with one or more primitives from a set of supported primitives associated with the subset of data sets, determining, based on the one or more labeled tokens, a set of higher order concepts corresponding to query operations, query conditions, or both, where each higher order concept includes multiple primitives of the set of supported primitives, training a neural network to learn a grammatical structure of the natural language query based on the one or more labeled tokens, the determined set of higher order concepts, or both, and generating a database query for querying the database system based on the one or more labeled tokens, the determined set of higher order concepts, and the neural network.

A non-transitory computer-readable medium storing code for querying a database system is described. The code may include instructions executable by a processor to receive a natural language query associated with a subset of data sets of a set of data sets stored in the database system, determine a set of tokens included in the natural language query, label one or more tokens of the set of tokens with one or more primitives from a set of supported primitives associated with the subset of data sets, determine, based on the one or more labeled tokens, a set of higher order concepts corresponding to query operations, query conditions, or both, where each higher order concept includes multiple primitives of the set of supported primitives, train a neural network to learn a grammatical structure of the natural language query based on the one or more labeled tokens, the determined set of higher order concepts, or both, and generate a database query for querying the database system based on the one or more labeled tokens, the determined set of higher order concepts, and the neural network.

In some examples of the method, apparatuses, and non-transitory computer-readable medium described herein, the database system includes a multi-tenant database system, and the neural network includes a first tenant-specific neural network corresponding to a first tenant of the multi-tenant database system associated with the subset of data sets. Some examples of the method, apparatuses, and non-transitory computer-readable medium described herein may further include operations, features, means, or instructions for receiving a second natural language query associated with a second subset of data sets of the set of data sets stored in the multi-tenant database system and generating a second database query for querying the multi-tenant database system based on the second natural language query and a second tenant-specific neural network corresponding to a second tenant of the multi-tenant database system associated with the second subset of data sets, where the first tenant-specific neural network is different from the second tenant-specific neural network.

Some examples of the method, apparatuses, and non-transitory computer-readable medium described herein may further include operations, features, means, or instructions for sending, for display at a user device, the one or more labeled tokens of the set of tokens, receiving, from the user device, a user input indicating an updated label corresponding to a token of the set of tokens, and relabeling the token with the updated label.

In some examples of the method, apparatuses, and non-transitory computer-readable medium described herein, training the neural network further may include operations, features, means, or instructions for training the neural network based on relabeling the token.

In some examples of the method, apparatuses, and non-transitory computer-readable medium described herein, determining the set of tokens may include operations, features, means, or instructions for performing a word breaking procedure on the natural language query to determine a set of words, converting the set of words into a common language using a Unicode transformation format 8-bit encoding, and determining the set of tokens based on the converted set of words.

Some examples of the method, apparatuses, and non-transitory computer-readable medium described herein may further include operations, features, means, or instructions for clustering a set of adjacent words of the converted set of words and determining whether to label the clustered set of adjacent words with a primitive from the set of supported primitives.

In some examples of the method, apparatuses, and non-transitory computer-readable medium described herein, labeling the one or more tokens with the one or more primitives may include operations, features, means, or instructions for comparing a first token to a set of terms associated with a first primitive, determining a string distance value between the first token and at least one term of the set of terms based on the comparing, and ranking an applicability of the first primitive to the first token based on the string distance value, where the first token may be labeled with the first primitive based on the ranked applicability satisfying a threshold.

Some examples of the method, apparatuses, and non-transitory computer-readable medium described herein may further include operations, features, means, or instructions for determining the set of terms associated with the first primitive based on metadata for the subset of data sets, a statistic for the subset of data sets, or a combination thereof.

Some examples of the method, apparatuses, and non-transitory computer-readable medium described herein may further include operations, features, means, or instructions for identifying a token of the one or more labeled tokens that is labeled with a temporal primitive and predicting a date field associated with the subset of data sets based on the temporal primitive, the neural network, or a combination thereof, where the database query may be generated based on the predicted date field.

Some examples of the method, apparatuses, and non-transitory computer-readable medium described herein may further include operations, features, means, or instructions for identifying a subset of the one or more labeled tokens, where each token of the subset of the one or more labeled tokens corresponds to a first primitive type, where the neural network may be trained based on the subset of the one or more labeled tokens.

In some examples of the method, apparatuses, and non-transitory computer-readable medium described herein, the first primitive type corresponds to a dimension field that may be associated with the subset of data sets or a measure field that may be associated with the subset of data sets.

In some examples of the method, apparatuses, and non-transitory computer-readable medium described herein, the neural network includes a data set-specific neural network corresponding to the subset of data sets. Some examples of the method, apparatuses, and non-transitory computer-readable medium described herein may further include operations, features, means, or instructions for training a universal neural network for the set of data sets to learn a second grammatical structure of the natural language query based on the one or more labeled tokens, the determined set of higher order concepts, or both and selecting to use the data set-specific neural network, the universal neural network, or a combination thereof to generate the database query based on the natural language query.

In some examples of the method, apparatuses, and non-transitory computer-readable medium described herein, the database system includes a multi-tenant database system, and the neural network includes a tenant-specific neural network corresponding to a tenant of a set of tenants of the multi-tenant database system. Some examples of the method, apparatuses, and non-transitory computer-readable medium described herein may further include operations, features, means, or instructions for training a tenant-agnostic neural network for the set of tenants to learn a second grammatical structure of the natural language query based on the one or more labeled tokens, the determined set of higher order concepts, or both, where the database query is generated based on the tenant-specific neural network and the tenant-agnostic neural network.

In some examples of the method, apparatuses, and non-transitory computer-readable medium described herein, the set of supported primitives includes a number, a numerical operator, an aggregation, a measure field, a dimension field, a field value, a date part, a date modifier, a sort operation, or a combination thereof.

In some examples of the method, apparatuses, and non-transitory computer-readable medium described herein, the set of higher order concepts includes a calculation, a measure range, a date range, a limit condition, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for querying a database system, comprising:
   receiving a natural language query associated with a subset of data sets of a plurality of data sets stored in the database system;
   labeling one or more tokens of a set of tokens included in the natural language query with one or more primitives from a set of supported primitives associated with the subset of data sets;
   determining, based at least in part on the one or more labeled tokens, a set of higher order concepts, wherein a higher order concept comprises multiple primitives of the set of supported primitives;
   training a neural network to learn a grammatical structure of the natural language query based at least in part on the one or more labeled tokens, the determined set of higher order concepts, or both;
   resolving one or more ambiguous terms corresponding to the one or more primitives used to label the one or more tokens based at least in part on the grammatical structure learned by the neural network, wherein a first field of the grammatical structure corresponding to an ambiguous term and a plurality of contexts is predicted using a relationship between the first field and a second field of the grammatical structure and a context of the second field;
   relabeling the one or more tokens based at least in part on resolving the one or more ambiguous terms; and
   generating a database query for querying the database system based at least in part on the one or more relabeled tokens, the determined set of higher order concepts, and the neural network.

2. The method of claim 1, wherein:
   the database system comprises a multi-tenant database system; and
   the neural network comprises a first tenant-specific neural network corresponding to a first tenant of the multi-tenant database system associated with the subset of data sets, the method further comprising:
   receiving a second natural language query associated with a second subset of data sets of the plurality of data sets stored in the multi-tenant database system; and
   generating a second database query for querying the multi-tenant database system based at least in part on the second natural language query and a second tenant-specific neural network corresponding to a second tenant of the multi-tenant database system associated with the second subset of data sets, wherein the first tenant-specific neural network is different from the second tenant-specific neural network.

3. The method of claim 1, further comprising:
   sending, for display at a user device, the one or more labeled tokens of the set of tokens;
   receiving, from the user device, a user input indicating an updated label corresponding to a token of the set of tokens; and
   relabeling the token with the updated label.

4. The method of claim 3, wherein training the neural network further comprises:
   training the neural network based at least in part on relabeling the token.

5. The method of claim 1, wherein determining the set of tokens comprises:
   performing a word breaking procedure on the natural language query to determine a set of words;
   converting the set of words into a common language using a Unicode transformation format 8-bit encoding; and
   determining the set of tokens based at least in part on the converted set of words.

6. The method of claim 5, further comprising:
   clustering a plurality of adjacent words of the converted set of words; and
   determining whether to label the clustered plurality of adjacent words with a primitive from the set of supported primitives.

7. The method of claim 1, wherein labeling the one or more tokens with the one or more primitives comprises:
comparing a first token to a set of terms associated with a first primitive;
determining a string distance value between the first token and at least one term of the set of terms based at least in part on the comparing; and
ranking an applicability of the first primitive to the first token based at least in part on the string distance value, wherein the first token is labeled with the first primitive based at least in part on the ranked applicability satisfying a threshold.

8. The method of claim 7, further comprising:
determining the set of terms associated with the first primitive based at least in part on metadata for the subset of data sets, a statistic for the subset of data sets, or a combination thereof.

9. The method of claim 1, further comprising:
identifying a token of the one or more labeled tokens that is labeled with a temporal primitive; and
predicting a date field associated with the subset of data sets based at least in part on the temporal primitive, the neural network, or a combination thereof, wherein the database query is generated based at least in part on the predicted date field.

10. The method of claim 1, further comprising:
identifying a subset of the one or more labeled tokens, wherein each token of the subset of the one or more labeled tokens corresponds to a first primitive type, wherein the neural network is trained based at least in part on the subset of the one or more labeled tokens.

11. The method of claim 10, wherein the first primitive type corresponds to a dimension field that is associated with the subset of data sets or a measure field that is associated with the subset of data sets.

12. The method of claim 1, wherein the neural network comprises a data set-specific neural network corresponding to the subset of data sets, the method further comprising:
training a universal neural network for the plurality of data sets to learn a second grammatical structure of the natural language query based at least in part on the one or more labeled tokens, the determined set of higher order concepts, or both; and
selecting to use the data set-specific neural network, the universal neural network, or a combination thereof to generate the database query based at least in part on the natural language query.

13. The method of claim 1, wherein:
the database system comprises a multi-tenant database system; and
the neural network comprises a tenant-specific neural network corresponding to a tenant of a plurality of tenants of the multi-tenant database system, the method further comprising:
training a tenant-agnostic neural network for the plurality of tenants to learn a second grammatical structure of the natural language query based at least in part on the one or more labeled tokens, the determined set of higher order concepts, or both, wherein the database query is generated based at least in part on the tenant-specific neural network and the tenant-agnostic neural network.

14. The method of claim 1, wherein the set of supported primitives comprises a number, a numerical operator, an aggregation, a measure field, a dimension field, a field value, a date part, a date modifier, a sort operation, or a combination thereof.

15. The method of claim 1, wherein the set of higher order concepts comprises a calculation, a measure range, a date range, a limit condition, or a combination thereof.

16. An apparatus for querying a database system, comprising:
a processor;
memory coupled with the processor; and
instructions stored in the memory and executable by the processor to cause the apparatus to:
receive a natural language query associated with a subset of data sets of a plurality of data sets stored in the database system;
label one or more tokens of a set of tokens included in the natural language query with one or more primitives from a set of supported primitives associated with the subset of data sets;
determine, based at least in part on the one or more labeled tokens, a set of higher order concepts, wherein a higher order concept comprises multiple primitives of the set of supported primitives;
train a neural network to learn a grammatical structure of the natural language query based at least in part on the one or more labeled tokens, the determined set of higher order concepts, or both;
resolve one or more ambiguous terms corresponding to the one or more primitives used to label the one or more tokens based at least in part on the grammatical structure learned by the neural network, wherein a first field of the grammatical structure corresponding to an ambiguous term and a plurality of contexts is predicted using a relationship between the first field and a second field of the grammatical structure and a context of the second field;
relabel the one or more tokens based at least in part on resolving the one or more ambiguous terms; and
generate a database query for querying the database system based at least in part on the one or more relabeled tokens, the determined set of higher order concepts, and the neural network.

17. The apparatus of claim 16, wherein:
the database system comprises a multi-tenant database system; and
the neural network comprises a first tenant-specific neural network corresponding to a first tenant of the multi-tenant database system associated with the subset of data sets, wherein the instructions are further executable by the processor to cause the apparatus to:
receive a second natural language query associated with a second subset of data sets of the plurality of data sets stored in the multi-tenant database system; and
generate a second database query for querying the multi-tenant database system based at least in part on the second natural language query and a second tenant-specific neural network corresponding to a second tenant of the multi-tenant database system associated with the second subset of data sets, wherein the first tenant-specific neural network is different from the second tenant-specific neural network.

18. The apparatus of claim 16, wherein the instructions are further executable by the processor to cause the apparatus to:
send, for display at a user device, the one or more labeled tokens of the set of tokens;
receive, from the user device, a user input indicating an updated label corresponding to a token of the set of tokens; and
relabel the token with the updated label.

19. A non-transitory computer-readable medium storing code for querying a database system, the code comprising instructions executable by a processor to:
 receive a natural language query associated with a subset of data sets of a plurality of data sets stored in the database system;
 label one or more tokens of a set of tokens included in the natural language query with one or more primitives from a set of supported primitives associated with the subset of data sets;
 determine, based at least in part on the one or more labeled tokens, a set of higher order concepts, wherein a higher order concept comprises multiple primitives of the set of supported primitives;
 train a neural network to learn a grammatical structure of the natural language query based at least in part on the one or more labeled tokens, the determined set of higher order concepts, or both;
 resolve one or more ambiguous terms corresponding to the one or more primitives used to label the one or more tokens based at least in part on the grammatical structure learned by the neural network, wherein a first field of the grammatical structure corresponding to an ambiguous term and a plurality of contexts is predicted using a relationship between the first field and a second field of the grammatical structure and a context of the second field;
 relabel the one or more tokens based at least in part on resolving the one or more ambiguous terms; and
 generate a database query for querying the database system based at least in part on the one or more relabeled tokens, the determined set of higher order concepts, and the neural network.

20. The non-transitory computer-readable medium of claim 19, wherein the instructions executable by the processor to label the one or more tokens with the one or more primitives are further executable by the processor to:
 compare a first token to a set of terms associated with a first primitive;
 determine a string distance value between the first token and at least one term of the set of terms based at least in part on the comparing; and
 rank an applicability of the first primitive to the first token based at least in part on the string distance value, wherein the first token is labeled with the first primitive based at least in part on the ranked applicability satisfying a threshold.

* * * * *